United States Patent [19]

Dangi

[11] Patent Number: 5,491,776
[45] Date of Patent: Feb. 13, 1996

[54] SIGNAL PROCESSING APPARATUS AND LEARNING METHOD THEREFOR

[75] Inventor: Ryoichi Dangi, Chiba, Japan

[73] Assignee: Kawasaki Steel Corporation, Hyogo, Japan

[21] Appl. No.: 290,080

[22] Filed: Aug. 12, 1994

Related U.S. Application Data

[63] Continuation of Ser. No. 30,290, filed as PCT/JP92/00980, Aug. 3, 1992, abandoned.

[30] Foreign Application Priority Data

Aug. 5, 1991 [JP] Japan .................................. 3-219133

[51] Int. Cl.$^6$ .................................................. G06F 15/18
[52] U.S. Cl. .............................. 395/11; 395/22; 395/23
[58] Field of Search ................................. 395/11, 22, 23, 395/24

[56] References Cited

U.S. PATENT DOCUMENTS

| | | | |
|---|---|---|---|
| 3,613,084 | 10/1971 | Armstrong | 340/172.5 |
| 4,945,494 | 7/1990 | Penz et al. | 395/23 |
| 4,965,443 | 10/1990 | Yamasaki | 395/22 |
| 4,979,126 | 12/1990 | Pao et al. | 395/24 |

(List continued on next page.)

FOREIGN PATENT DOCUMENTS

| | | | |
|---|---|---|---|
| 3-35353 | 2/1991 | Japan | G06F 15/332 |
| 3-164815 | 7/1991 | Japan | G06F 15/18 |
| 3-286366 | 12/1991 | Japan | G06F 15/332 |

OTHER PUBLICATIONS

Wang et al, "Three–Layer Neural Networks for Spectral Estimation", 1990 Int'l Conf on Acoustics, Speech, and Signal Processing, Apr. 3–6 1990, pp. 881–884 vol. 2.

Wang et al, "A Single Layer Perception for Fourier Transform", 6th Multidimensional Signal Processing Workshop, Sep. 6–8 1989, p. 158.

H. A. Malki and A. Moghaddamjoo, "Using the Karhunen–Loe've Transformation in the Back–Propagation Training Algorithm," IEEE Transactions on Neural Networks, vol. 2, No. 1, Jan. 1991, pp. 162–165.

David W. Tank and John J. Hopfield, "Simple 'Neural' Optimization Networks: An A/D Converter, Signal Decision Circuit, and a Linear Programming Circuit," IEEE Transactions on Circuits and Systems, vol., CAS–33, No. 5, May 1986, pp. 533–541.

Culhane et al., "A Neural Net Approach to Discrete Hartley and Fourier Transforms," *IEEE Transactions on Circuits and Systems*, vol. 36, No. 5, May 1989, pp. 695–702.

Siu et al., "Neural Computation of Arithmetic Functions," *Proc. of the IEEE*, vol. 78, No. 10, Oct. 1990, pp. 1669–1675.

Morisue et al., "Neural Networks for Digital Adder," *1991 IEEE International Symposium on Circuits and Systems*, vol. 3, Jun. 11–14, 1991, pp. 1605–1608.

"Proceeding of Second Japan–Korea Joint Seminar," Feb. 24, 1990, Kyungpook National University and Sophia University, pp. 301–315.

*Primary Examiner*—Robert W. Downs
*Attorney, Agent, or Firm*—Oliff & Berridge

[57] ABSTRACT

Mathematical calculation processing is executed at a high speed for an input signal of image information or the like. Weight coefficients corresponding to a DCT (discrete cosine transform) are set in a neural network NN of an n-layer structure including an input layer I1, (an intermediate layer H1) and an output layer O1. The input layer I1 is constituted from a number of input interfaces equal to the number of picture elements included in a block 12, and the output layer O1 is constituted from a number of neurons equal to the number of DCT coefficients to be outputted. When input information of the block 12 is inputted to the neural network NN, DCT coefficients a(0) to a(63) which are results of DCT processing of the image information are outputted immediately. The weight coefficient is determined by learning using, as teacher data, DCT coefficients obtained by actual mathematical calculation of the same image information as that inputted to the neural network NN by a DCT transform section.

1 Claim, 17 Drawing Sheets

U.S. PATENT DOCUMENTS

| | | | |
|---|---|---|---|
| 5,053,974 | 10/1991 | Penz | 395/22 |
| 5,086,479 | 2/1992 | Takenaga et al. | 395/22 |
| 5,101,440 | 3/1992 | Watanabe et al. | 382/22 |
| 5,129,039 | 7/1992 | Hiraiwa | 395/24 |
| 5,142,665 | 8/1992 | Bigus | 395/76 |
| 5,216,750 | 6/1993 | Smith | 395/24 |
| 5,268,834 | 12/1993 | Sanner et al. | 395/22 |

FIG.17
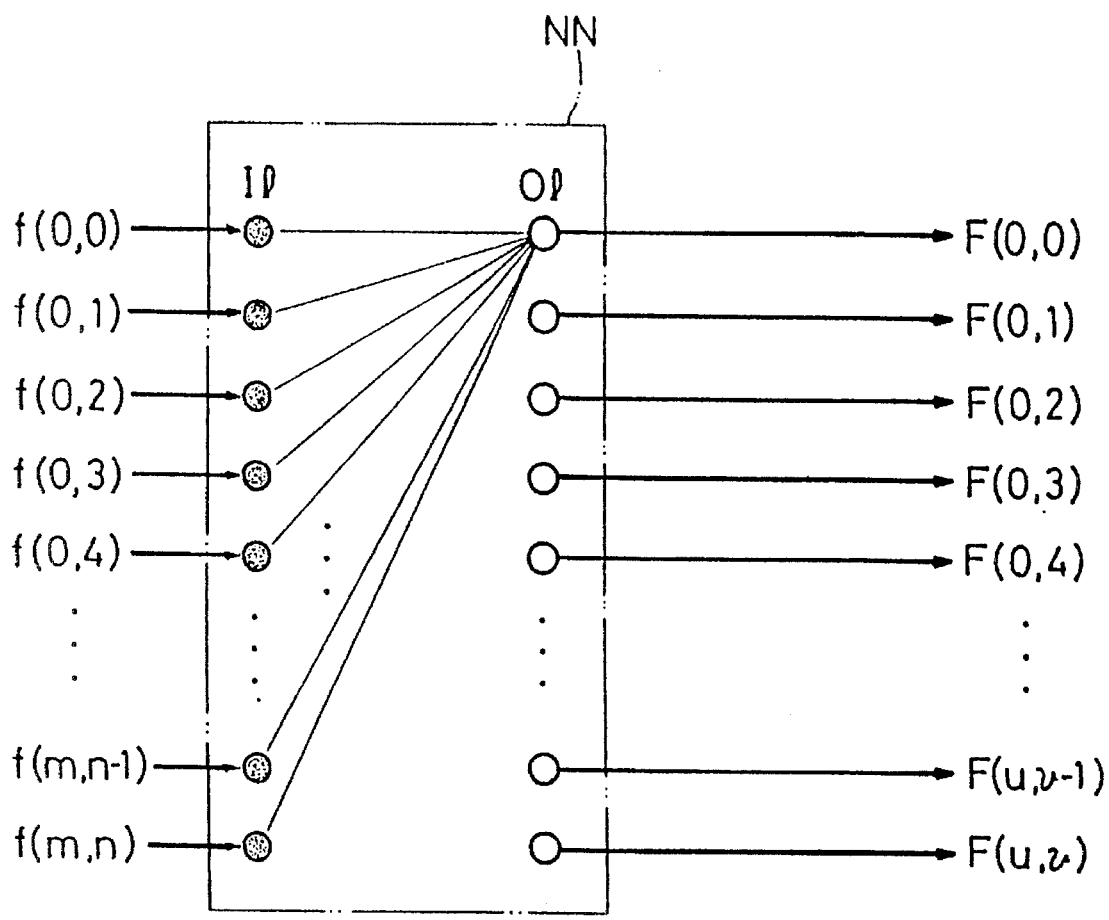
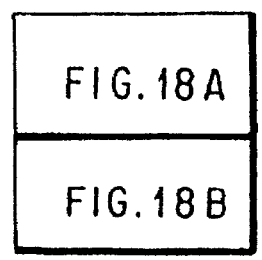
FIG.18

SIGNAL PROCESSING APPARATUS AND LEARNING METHOD THEREFOR

This is a continuation of application Ser. No. 08/030,290 filed as PCT/JP92/00980, Aug. 3, 1992, now abandoned.

TECHNICAL FIELD

This invention relates to a signal processing apparatus and a learning method therefore, and more particularly to a signal processing apparatus wherein signal processing of a signal such as an image signal or an audio signal by predetermined mathematical calculation can be performed at a high speed and a learning method therefore.

BACKGROUND ART

It is a common practice to apply various orthogonal transforms to a signal such as an image signal or an audio signal to effect compression of information, removal of an interference pattern and so forth.

For example, such an orthogonal transform which can be applied to a spatial axis to frequency axis transform, there are a Fourier transform (FT), a discrete cosine transform (DCT), an Hadamard transform and so forth. In those transforms, calculation processing is performed based on expressions individually defined. For processing for execution of calculation in each transform, a very long time is required only by processing of software, and accordingly, hardware for exclusive use for each particular processing is developed.

As hardware for exclusive use for an orthogonal transform, a discrete cosine transform apparatus disclosed, for example, in Japanese Patent Laid-Open Application No. Heisei 3-35353 is known. The discrete cosine transform apparatus executes calculation of a discrete cosine transform of degree $2^{n+1}$ and is constructed using a basic arithmetic unit A and another basic arithmetic unit B. The basic arithmetic unit A is a circuit that temporarily stores input data therein and adds or subtracts them. The basic arithmetic unit B is a circuit which temporarily stores input data therein and adds or subtracts results of a number of multiplications smaller than the number of the input data. The basic arithmetic unit A is connected at a first stage and n circuits in each of which the basic arithmetic unit B and the basic arithmetic unit A are connected in cascade connection are connected in cascade connection to the basic arithmetic unit A at the first stage.

In the discrete cosine transform apparatus described above, however, since a DCT (discrete cosine transform) is calculated in accordance with a signal flow diagram (butterfly calculation algorithm) according to the value of n shown in FIG. 18 and an inverse transform to that is calculated in accordance with a flow reverse to that of the transform in the same signal flow diagram, when much parallel calculation processes are executed for a DCT, a great number of communications take place between processing data. Therefore, there is a problem in that an increase in speed of processing by parallel operation is not achieved sufficiently and the discrete cosine transform apparatus cannot always cope sufficiently with a DCT for information which is high in parallelism such as image information.

In particular, in the signal flow diagram of FIG. 18 applied to the apparatus described above, one calculation is performed for each of n ranges defined by broken lines. Accordingly, when a DCT is executed by the apparatus described above, only n parallel calculation processes to the utmost can be executed. Incidentally, in the case of the algorithm of FIG. 18, since n=4, only four parallel processes can be executed to the utmost. Besides, since there are great differences among processing load amounts of the parallel processes, also the effect of parallel processing is low.

Further, if it is tried to increase the number of ranges defined by broken lines in order to increase the number of parallel processes under the algorithm described above, then it becomes necessary to communicate information for butterfly between chips which execute calculations, and consequently, the overhead for communication of information becomes high and the advantage of parallel processing is reduced.

Meanwhile, with regard to a FT, when image information which is constituted from, for example, 1,024×1,024 pixels (picture elements) is to be processed by FT processing, several tens of minutes are required with an EWS (engineering work station) in which a general purpose processor is installed, and a calculation time of several minutes is required even with a processor for exclusive use (DSP: digital signal processor).

Further, in transform processing including the DCT and the FT described above, since all of them obtain a result above, a long time is required for calculation processing. Consequently, there is a problem in that, if it is tried to achieve an increase of the speed of processing, then an algorithm for parallel calculation is required.

DISCLOSURE OF THE INVENTION

The present invention has been made to solve the problems of the conventional apparatus described above, and it is a first subject of the present invention to provide a signal processing apparatus wherein predetermined mathematical calculation processing can be applied parallelly and hence at a high speed to one, two or more input signals without employing an algorithm for parallel processing and so forth.

It is a second subject of the present invention to provide a learning method for a signal processing apparatus which is suitable to provide a predetermined mathematical calculation processing function to the signal processing apparatus described above.

The present invention attains the first subject described above by a signal processing apparatus for performing mathematical calculation processing for each of one, two or more input signals, which is constructed such that it comprises a neural network in which weight coefficients are set corresponding to a predetermined kind of mathematical calculation.

Further, the present invention attains the first subject described above similarly by a signal processing apparatus for performing mathematical calculation processing for each of one, two or more input signals, which is constructed such that it comprises a neural network in which weight coefficients are set corresponding to a predetermined kind of mathematical calculation, and a mathematical calculation section for executing predetermined mathematical calculation for each of the one, two or more input signals.

Further, the present invention attains the first subject described above with a higher degree of certainty by the signal processing apparatus, which is constructed such that it comprises output selection means for selecting either one of an output of the neural network and an output of the mathematical calculation section.

Further, the present invention attains the first subject described above similarly by a signal processing apparatus for performing mathematical calculation processing for each of one, two or more input signals, which is constructed such that it comprises a neural network in which weight coefficients are set corresponding to a predetermined kind of mathematical calculation, and a storage section in which weight coefficients individually corresponding to one, two or more predetermined kinds of mathematical calculation are stored, and that weight coefficients to be set to the neural network can be changed in accordance with one of the kinds of mathematical calculation.

Further, the present invention attains the first subject described above similarly by a signal processing apparatus for performing mathematical calculation processing for each of one, two or more input signals, which is constructed such that it comprises a neural network in which weight coefficients are set corresponding to a predetermined kind of mathematical calculation, a mathematical calculation section for executing predetermined mathematical calculation for each of the one, two or more input signals, and a storage section in which weight coefficients individually corresponding to one, two or more predetermined kinds of mathematical calculations are stored, and that weight coefficients to be set to the neural network can be changed in accordance with one of the kinds of mathematical calculations.

Further, the present invention attains the first subject described above similarly by a signal processing apparatus for performing mathematical calculation processing for each of one, two or more input signals, which is constructed such that it comprises a two-layer neural network in which weight coefficients are set corresponding to product summing calculation.

Furthermore, the present invention attains the second subject described above by a learning method for a signal processing apparatus which performs mathematical calculation processing for each of one, two or more input signals, which is constructed such that weight coefficients of a neural network provided in the signal processing apparatus are modified so that outputs of the neural network may coincide with results of calculation obtained by actual mathematical calculation.

While neural networks are conventionally used for information processing of image information, audio information and so forth, it is a common idea that such neural networks are not suitable for mathematical calculation. Accordingly, in such information processing as described above, a neural network is applied only to a portion where mathematical calculation cannot be executed, and there has been no idea of applying a neural network to mathematical calculation.

The inventor of the present invention has made various investigations of information processing by a neural network and discovered that mathematical calculation can be executed by a neural network if a particular learning method is applied to the neural network and a suitable weight coefficient is set. The present invention has been made based on the discovery.

FIG. 1 conceptively shows an example of a signal processing apparatus of the present invention. Here, a case will be described wherein predetermined calculation is performed for image information, which has been cut away in a predetermined size in units of picture elements from a one frame screen 10 of image information and is possessed by a block 12, by a neural network processing apparatus 14 included in the signal processing apparatus.

The neural network processing apparatus 14 described above includes a hierarchic neural network NN including n layers (n is equal to or greater than 2) including an input layer and an output layer, and the input layer is constituted from a number of input interface units (input layer neurons) equal to the number of picture elements included in the block 12 described above such that the interface units and the picture elements correspond in a one-by-one corresponding relationship to each other.

In the neural network NN described above, neurons in each of the layers except the input layer are coupled to neurons in a layer preceding to the layer, and as a rule, each of neurons constituting one layer is coupled to all of neurons constituting the preceding layer. However, each of neurons constituting one layer need not necessarily be coupled to all neurons constituting the preceding layer in this manner.

In the neuron network NN described above, each of the layers except the input layer is constituted from such neurons N as shown as a model in FIG. 2. The neuron N is defined to have a function of, as illustrated in FIG. 2, adding all of values obtained by multiplying respective corresponding weight coefficients Wi to input signals Ii (i=1 to N), providing a threshold value to the sum, transforming a result of it in accordance with, for example, a non-linear function F(x) and outputting a result of the transform. When the output of such one neuron N is represented by O, the output O is given by the following expression (1). It is to be noted that θ in the expression is the threshold value.

$$O = F\left( \left\{ \sum_{i=1}^{N} (Ii \times Wi) \right\} - \theta \right) \quad (1)$$

Further, as the non-linear function F(x) mentioned above, a sigmoid function represented by the following equation (2) can be listed. As a further non-linear function, a function having a non-linear form such as, for example, a binary digitizing function can be listed. Further, the function F(x) may otherwise be linear.

$$F(x)=1/\{1+\exp(-x)\} \quad (2)$$

In the present invention, a weight coefficient with which, for example, an orthogonal transform can be performed for an input signal (image information) from each picture element inputted to the input layer is set to a Junction between each two of the neurons constituting the neural network NN. In particular, the weight coefficients $W_1$ to $W_N$ of the neurons are set as suitable values corresponding to predetermined mathematic calculation.

Accordingly, if input signals P0,0 to Pm,n are inputted from the individual picture elements of the block 12 to the input layer as shown in FIG. 1, then output signals a(0) to a(k) are outputted from the output layer. The output signals a(0) to a(k) are coincident with transform coefficients which are results of calculation actually applying an expression for orthogonal transform to the input signals P0,0 to Pm,n described above.

In this manner, according to the signal processing apparatus 14 of the present invention, only by inputting a plurality of input signals, results of application of predetermined mathematic calculation for an orthogonal transform or the like to the input signals can be outputted.

Further, when mathematical calculation processing is executed by the neural network NN as described above, since the neurons in each layer can operate independently of one another, a number of parallel processes corresponding to the number of the neurons can be executed. Accordingly, with the signal processing apparatus 14 described above, it is possible to execute a very large number of parallel processes, and therefore, it is possible to execute calculation processing at a very high speed.

In the present invention, setting of the weight coefficients of the neural network NN provided in the neural network processing apparatus 14 is performed by the following learning. It is to be noted that the learning is performed for various images having different information, and the learning is repeated until errors from teacher data become smaller than a certain threshold value.

When a calculation function of, for example, an orthogonal transform is provided to the neural network NN described above, mathematical calculation is executed actually for same input signals as those to be inputted from the block 12 described above by a mathematical calculation section 16 having a mathematical calculation function of an orthogonal transform to obtain transform coefficients a(0) to a(k) which are results of the calculation. The transform coefficients a(0) to a(k) are used as teacher data to effect learning to the neural network NN described above by so-called back propagation.

More particularly, learning is performed repetitively so that the outputs [a(0)] to [a(k)] when the input signals P0,0 to Pm,n from the block 12 are inputted may coincide with a(0) to a(k) which are correct transform coefficients calculated by the mathematical calculation section 16, thereby to converge the weight coefficients of the junctions between the neurons to particular values, and the thus converged weight coefficients are set to the junctions between the neurons.

Further, in the present invention, weight coefficients of the neural networks NN corresponding to a plurality of kinds of mathematical calculation are calculated in advance by learning similar to that described above, and the weight coefficients are stored individually in a storage section. Consequently, weight coefficients necessary for a desired mathematical calculation process can be sent from the storage section into the neural network NN. As a result, various types of mathematical calculation can be applied to input signals in accordance with the necessity.

According to the present invention, when signal processing of an image signal, an audio signal or the like is performed, calculation processing which is conventionally performed by convolution can be performed at a high speed.

Further, while orthogonal transform processing such as a FT or a DCT for performing a time axis to spatial axis transform or the like is conventionally performed by a calculation method individually based on a given expression, according to the present invention, processing substantially same as that when sequential calculation is actually executed can be performed without knowing a detailed mathematical expression for parallel processing. Further, since the processing can be performed parallelly between the neurons of each layer, it is possible to execute a number of parallel processes equal to the number of the neurons, and therefore, calculation can be executed at a very high speed.

It is to be noted that, as the technique of applying a neural network to image processing such as compression, transmission and decompression of image information, many techniques including, for example, Japanese Patent Laid-Open Application No. Heisei 3-53782 are known.

In image processing by those conventional neural networks, it is a common practice that an image is compressed by making the number of neurons in an intermediate layer smaller than the number of neurons of the input layer and then outputs of the intermediate layer are transformed into data of a transmission frame format, whereafter they are transmitted, and on the reception side, a decompressed image is outputted from a neuron layer which corresponds to the output layer of the neural network.

Here, it is a practice that learning by back propagation is performed using the input signals (transmitted image) as teacher signals so that a decompressed image may approach the transmitted image as near as possible.

In the conventional image processing described above, the neural network is treated as a black box and it is unknown how information is processed and outputted in and from the neural network. In contrast, in the present invention, the neural network NN has a calculation processing function, and since input signals are processed by the neural network NN, same precise results of calculation as those obtained when mathematical calculation is applied actually to the input signals can be outputted, and in this regard, the present invention is essentially different from the conventional image processing by a neural network.

In the present invention, when, for example, output selection means for selecting either one of an output of the neural network processing apparatus 14 and an output of the mathematical calculation section 16 shown in FIG. 1 described hereinabove is provided, at an initial stage wherein weight coefficients of the junctions of the neural network for predetermined mathematical calculation are not established as yet, results of mathematical calculation executed actually by the mathematical calculation section 16 are outputted, and then subsequent mathematical calculation is executed by the mathematical calculation section 16 and learning of the neural network is performed using the results of mathematical calculation as teacher data.

By this, at the stage wherein weights to junction coefficients are not established as yet, the results of the actual mathematical calculation are utilized, but after calculation of the neural network reaches a desired degree of accuracy as a result of learning, the output of the neural network is selected, and consequently, it is possible to utilize the results of the processing. Further, if the output error thereafter becomes excessively large, then re-learning can be performed so as to maintain the processing accuracy.

Since it is possible to select one of the two outputs described above in this manner, it is possible to utilize accurate results of mathematical calculation even at an initial stage at which results of processing cannot be utilized conventionally since the accuracy in calculation processing of the neural network is low. Further, since it is possible to make use of results of high speed processing of the neural network after the accuracy of calculation processing of the neural network is improved by learning, it is possible to achieve improvement of the processing efficiency as a whole.

Further, in the present invention, where the signal processing apparatus comprises a neural network in which weight coefficients are set corresponding to a predetermined kind of mathematical calculation and a storage section in which weight coefficients individually corresponding to one, two or more predetermined kinds of mathematical calculation are stored and weight coefficients to be set to the neural network can be changed in accordance with one of the kinds of mathematical calculation, various kinds of mathematical calculation can be executed by the same signal processing apparatus, and it becomes possible to rapidly perform operation upon changing over the weight coefficients in order to cause the neural network to execute a different kind of mathematical calculation.

Furthermore, in the present invention, where the neural network has a two-layer structure and weight coefficients for product summing calculation are set to the synapse junctions of the two-layer structure, perfectly parallel mathematical calculation processing can be executed in a very high efficiency.

BRIEF DESCRIPTION OF THE DRAWINGS

FIG. 17 is a diagrammatic view schematically showing a neural network provided in a signal processing apparatus of a fifth embodiment according to the present invention.

BEST MODE FOR CARRYING OUT THE INVENTION

In the following, embodiments of the present invention will be described in detail with reference to the drawings.

Figure 3:
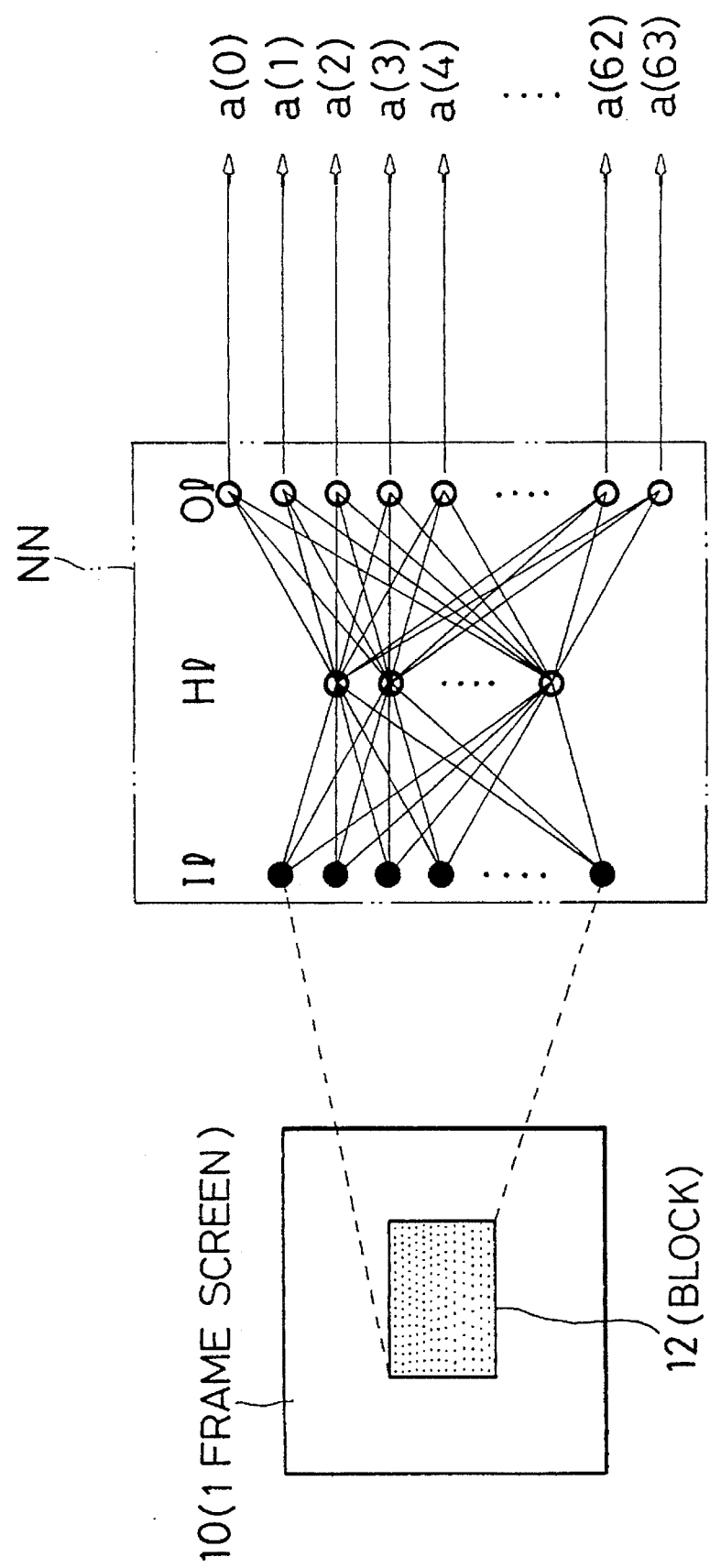
FIG. 3 is a schematic diagrammatic view showing essential part of a signal processing apparatus of an embodiment according to the present invention together with operation of the same.
Figure 6:
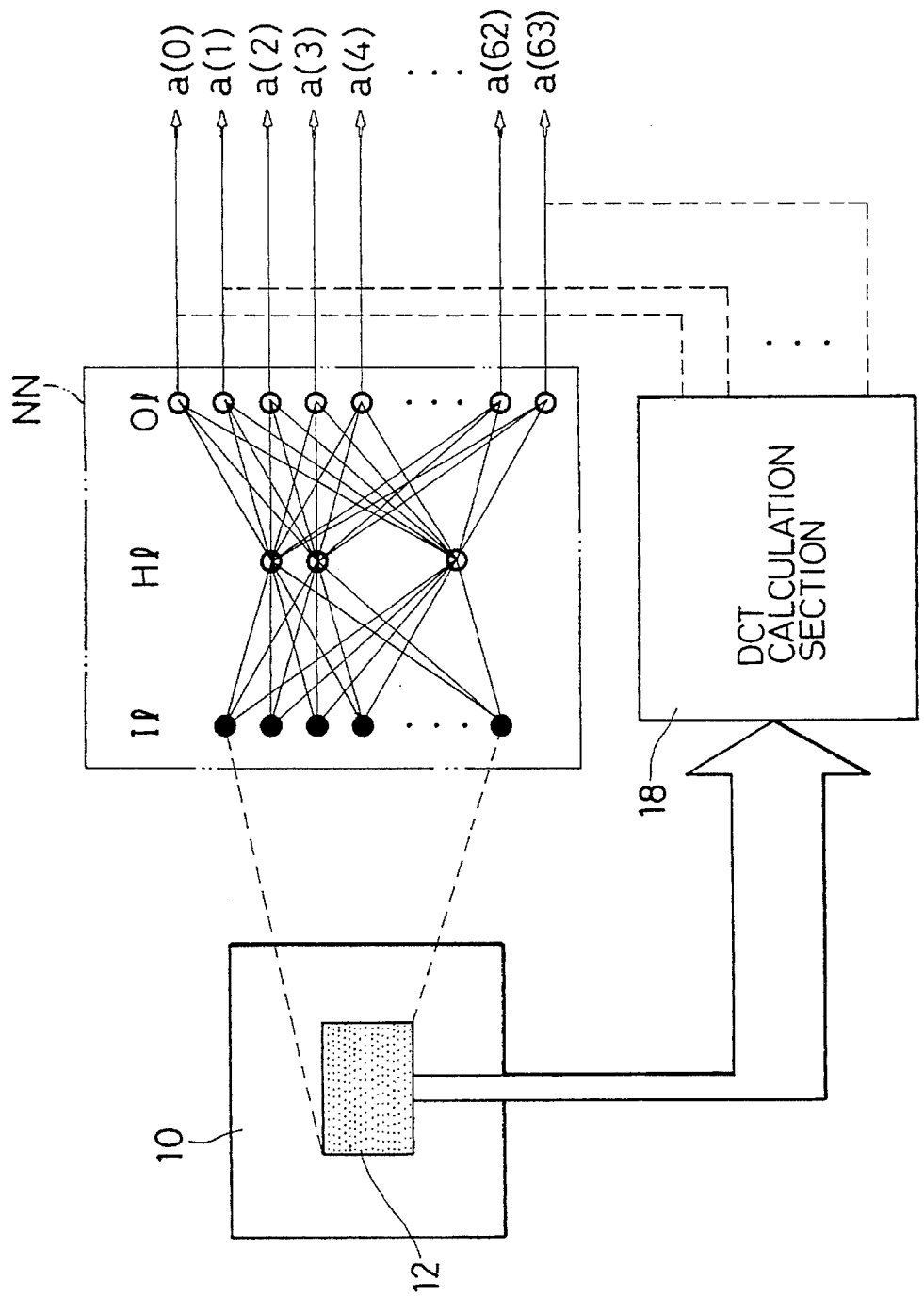
FIG. 6 is a schematic diagrammatic view illustrating a learning method to the signal processing apparatus of the present embodiment.

FIG. 3 is a schematic diagrammatic view showing essential part of a signal processing apparatus of a first embodiment according to the present invention together with operation of the same. The signal processing apparatus of the present embodiment includes a DCT calculation section as a mathematical calculation section as shown in FIG. 6 which will be hereinafter described, and is substantially the same as that shown in FIG. 1 described hereinabove.

The signal processing apparatus described above can execute a DCT, which is one of orthogonal transforms, of input signals from 64 picture elements included in a block 12 cut away from a one frame screen 10 and including 8 picture elements ×8 picture elements as shown in FIG. 3.

The DCT is defined by the following expression (3) when a discrete function is represented by $f(j)$ ($j=0, 1, \ldots, N-1$), and an inverse transform to the DCT is given by the expression (4). The DCT is a transform method which can be applied, for example, to a time axis to spatial axis transform, similarly to a FT.

$$F(k) = \{2C(k)/N\} \sum_{j=0}^{N-1} f(j)\cos[(2j+1)k\pi/(2N)] \quad (3)$$
$$(k = 0, 1, \ldots N-1)$$

$$f(j) = \sum_{k=0}^{N-1} C(k)F(k) \times \cos[(2j+1)k\pi/(2N)] \quad (4)$$
$$(j = 0, 1, \ldots N-1)$$

where $C(k)=1/\sqrt{2}$ when $k=0$, but $C(k)=1$ when $k\neq 0$.

The DCT can transform DCT coefficients obtained by application thereof, for example, to certain image information to change the information density so that the information may be concentrated upon low frequency components as shown in the following Table 1, and as a result, since portions of 0 in the table can be ignored, the information can be compressed. In other words, the DCT has a characteristic that information can be compressed by applying run-length coding by zigzag scanning.

TABLE 1

| 7 | 6 | 5 | 4 | 3 | 3 | 2 | 2 | 2 | 1 | 1 | 1 | 1 | 1 | 0 | 0 |
|---|---|---|---|---|---|---|---|---|---|---|---|---|---|---|---|
| 6 | 5 | 4 | 4 | 3 | 3 | 2 | 2 | 1 | 1 | 1 | 1 | 1 | 0 | 0 | 0 |
| 5 | 4 | 4 | 3 | 3 | 2 | 2 | 2 | 1 | 1 | 1 | 1 | 0 | 0 | 0 | 0 |
| 4 | 4 | 3 | 3 | 3 | 2 | 2 | 2 | 1 | 1 | 1 | 1 | 0 | 0 | 0 | 0 |
| 3 | 3 | 3 | 3 | 2 | 2 | 2 | 1 | 1 | 1 | 1 | 0 | 0 | 0 | 0 | 0 |
| 3 | 3 | 2 | 2 | 2 | 2 | 2 | 1 | 1 | 1 | 1 | 0 | 0 | 0 | 0 | 0 |
| 2 | 2 | 2 | 2 | 2 | 2 | 1 | 1 | 1 | 1 | 0 | 0 | 0 | 0 | 0 | 0 |
| 2 | 2 | 2 | 2 | 1 | 1 | 1 | 1 | 1 | 1 | 0 | 0 | 0 | 0 | 0 | 0 |
| 2 | 1 | 1 | 1 | 1 | 1 | 1 | 1 | 1 | 0 | 0 | 0 | 0 | 0 | 0 | 0 |
| 1 | 1 | 1 | 1 | 1 | 1 | 1 | 1 | 1 | 0 | 0 | 0 | 0 | 0 | 0 | 0 |
| 1 | 1 | 1 | 1 | 1 | 1 | 1 | 0 | 0 | 0 | 0 | 0 | 0 | 0 | 0 | 0 |
| 1 | 1 | 1 | 1 | 1 | 0 | 0 | 0 | 0 | 0 | 0 | 0 | 0 | 0 | 0 | 0 |
| 1 | 1 | 1 | 1 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

The signal processing apparatus of the present embodiment includes a feed forward neural network NN of the three-layer structure including an input layer I1 constituted from 64 input interface units (neurons) equal to the number of picture elements included in the one block 12, an intermediate layer H1 constituted from a number of neurons independent of the number of the neurons included in the input layer I1, and an output layer O1 constituted from a number of neurons equal to the number (64) of the neurons included in the input layer I1. It is to be noted that, since, in the present embodiment, the number of DCT coefficients obtained as outputs is 64, also the output layer O1 is constituted from 64 neurons.

The intermediate layer H1 is constituted, for example, from a sufficient number of neurons necessary to eliminate redundancy. The necessary and sufficient number of neurons can be determined from a converging condition of learning to the neural network which will be hereinafter described in detail. In particular, the intermediate layer is first constituted from an excessively great number of neurons, and then learning is executed while the number of neurons is successively reduced, so that the necessary and sufficient number of neurons can be determined as a minimum number of neurons with which the learning converges. This similarly applies to the number of layers.

Weight coefficients corresponding to mathematical calculation of the DCT are set in advance to the junctions between the neurons included in the neural network NN described above.

Accordingly, if image data (input signals) are inputted from the 64 picture elements included in the block 12 described above to the input layer I1, then 64 DCT coefficients a(0) to a(63) are outputted immediately from the output layer O1.

In this manner, the signal processing apparatus of the present embodiment can execute DCT calculation processing at a high speed for the image data inputted thereto and can output results of the DCT calculation processing.

Figure 2:
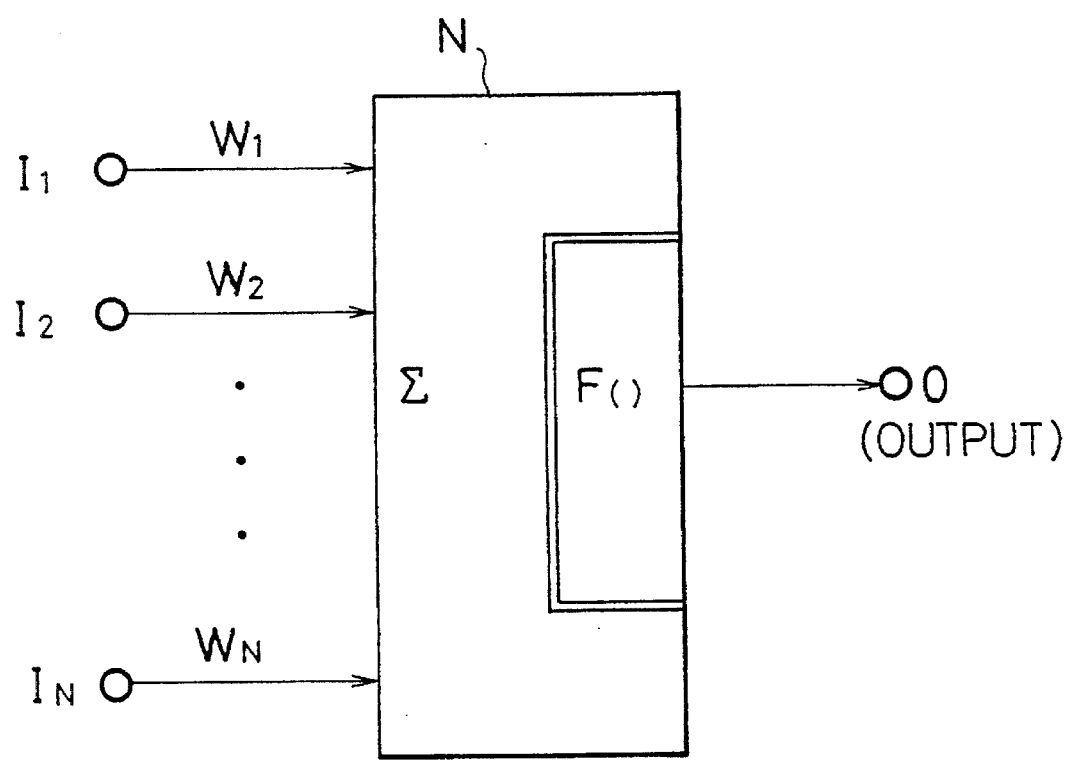
FIG. 2 is a schematic diagrammatic view showing a neuron model.
Figure 4:
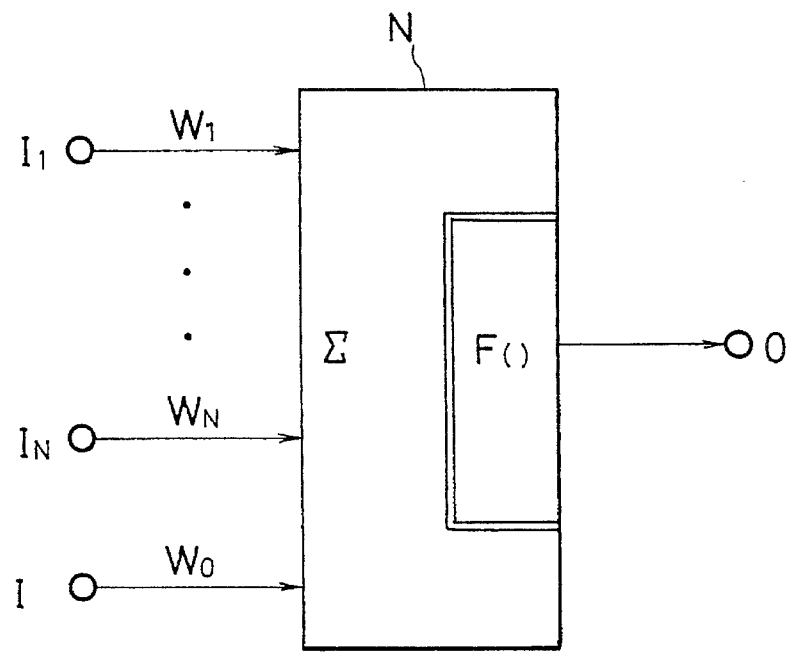
FIG. 4 is a schematic diagrammatic view showing a neuron model applied to the present invention.
Figure 5:
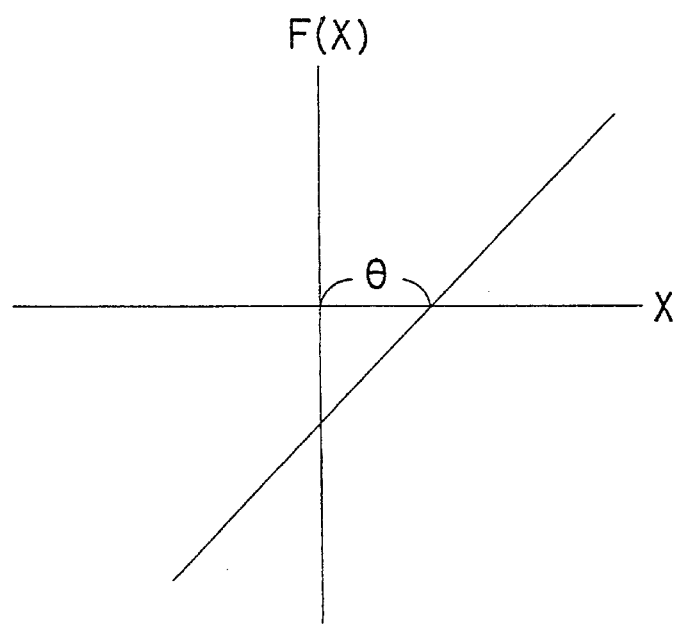
FIG. 5 a diagram showing a characteristic of a sigmoid function.

It is to be noted that, in the present embodiment, each of the neurons constituting the intermediate layer H1 and the output layer O1 of the neural network NN can, as shown as a neuron model of FIG. 4, in addition to the function of the neuron model shown in FIG. 2 described hereinabove, place the threshold value $\theta$ of the expression (1) described hereinabove to $1 \times W_0$ and change the threshold value $\theta$ by learning together with a weight coefficient of each junction. However, in the present neuron N, such a function $F(x)=x-\theta$ as shown in FIG. 5 is adopted as the function and learning is performed so that the threshold $\theta$ may be equal to 0.

Subsequently, a method of setting weight coefficients corresponding to mathematical calculation of the DCT to the neural network NN provided in the signal processing apparatus of the present embodiment will be described.

Figure 1:
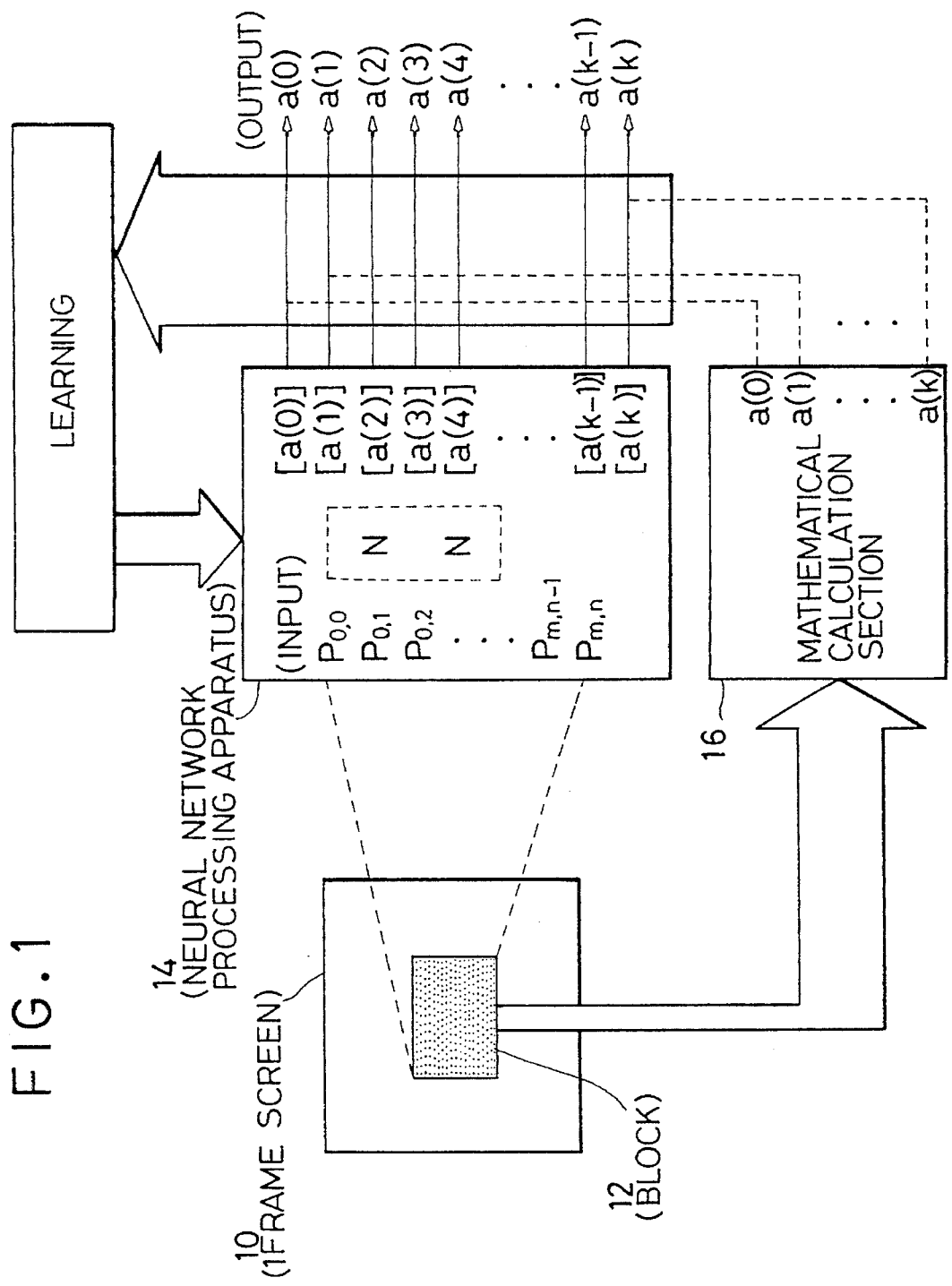
FIG. 1 is a schematic diagrammatic view illustrating a basic concept of the present invention.

FIG. 6 is a schematic diagrammatic view corresponding to FIG. 1 described hereinabove for illustrating a learning method to the signal processing apparatus of the present embodiment.

First, image information (input signals) identical with a subject to be processed by the neural network NN described above is inputted to a DCT calculation section 18. The DCT calculation section 18 has an independent calculation processing function and actually applies a mathematical expression of the DCT defined by the expression (3) described hereinabove to the image information to calculate accurate DCT coefficients.

Values of the DCT coefficients thus calculated are used as teacher data to outputs of the neural network NN obtained already. In particular, the weight coefficients of the neurons are updated so that mean square errors between the outputs of the neural network NN and the DCT coefficients described above which are teacher data may individually be minimum.

Learning is performed for various images in accordance with the procedure described above, and such learning is repeated until the errors between the two values may be smaller than a certain threshold value so as to make the outputs of the neural network NN coincide with results of DCT calculation by ordinary mathematical calculation.

Describing the learning method described above in more detail, if image information is inputted from each pixel to the input layer I1 the neurons of which correspond in a one-by-one corresponding relationship to the pixels of the one block 12, each of the neurons of the intermediate layer H1 outputs an output O (here N=64) given by a general expression of the expression (1) described hereinabove to the next output layer O1. Here, such outputs O are outputted to all of the neurons of the output layer O1 as a rule, and from each of the neurons of the output layer O1, a result of calculation is outputted as a final output.

Meanwhile, in a learning phase, learning to the neural network NN described above is performed using the DCT coefficients a(0) to a(63) obtained by the DCT calculation section 18 described above as teacher data.

Particularly, where the output of an m-th neuron of the output layer O1 is represented by Om and the teacher data (teacher signal) provided to the neuron is represented by Tm, the weight is updated so that the mean square error Em between the teacher data Tm and the output Om may be minimum in accordance with the following expression (5). It is to be noted that here the teacher data Tm is identical with the DCT coefficient described above obtained by actually applying the expression (3) described above to the image information described above.

$$Em = \sum_{m=1}^{k} (Tm - Om)^2 \qquad (5)$$

Learning wherein the weight coefficients of the junctions between the neurons of the neural network NN are updated so that the errors Em in the expression (5) described above may be minimum is executed. Learning is repeated in accordance with a similar procedure until the errors Em become smaller than a certain threshold value. However, images having various components ranging from low frequency region to high frequency region must necessarily be used in learning.

Further, updating of the weight coefficients of the junctions of the neural network NN can be performed, for example, in the following manner.

Now, if it is assumed that an output given by the expression (1) is represented by Om, the mean square error Em is given by the following expression (6) equivalent to the expression (5) described above (equivalent in finding out a pole as described below).

$$Em = \{Tm - Om\}^2 \qquad (6)$$

Where the weight coefficient before updating is represented by Wt and the updating amount is represented by $\Delta$ W, the weight coefficient Wt+1 after updating is given by the following expression (7).

$$Wt+1 = wt + \Delta W \qquad (7)$$

Here, since the expression (6) draws a downwardly convex parabolic curve, in order to find out a minimum value of the error Em described above, partial differentiation is performed for the expression (6) with respect to the weight coefficient Wm to place it to the following expression (8).

$$\delta Em / \delta Wm = 0 \qquad (8)$$

In particular, by placing the output O of the expression (1) described hereinabove to Om, substituting the expression (1) into the expression (6) described above and then applying the expression (8), a minimum value of the error Em described above can be found out readily. And, the updating amount $\Delta$ W described above is given by the following expression (9). Here, Im is an input signal.

$$\Delta W = 2\{Tm - Om\}\{Om(1 - Om) \cdot Im\} \quad (9)$$
$$= 2\{Tm - F(Im \cdot Wm)\} \times \{F(Im \cdot Wm) \times (1 - F(Im \cdot Wm) \cdot Im\}$$

Thereafter, learning is repeated in accordance with a similar procedure until the error Em becomes smaller than the threshold value, and a weight coefficient thus converged is set to the neural network NN provided in the signal processing apparatus of the present embodiment. It is to be noted that the threshold value described above is set to an optimum value by learning.

As described in detail so far, according to the signal processing apparatus of the present embodiment, since weight coefficients corresponding to mathematical calculation of a DCT are set to the neural network NN, only by inputting image information from each picture element of each block 12, DCT coefficients equal to those obtained when mathematical calculation is actually executed can be outputted.

Further, according to the present embodiment, since DCT calculation is executed by the neural network NN, calculation can be processed parallelly for individual neurons constituting each layer, and accordingly, DCT coefficients can be calculated at a very high speed.

Figure 7:
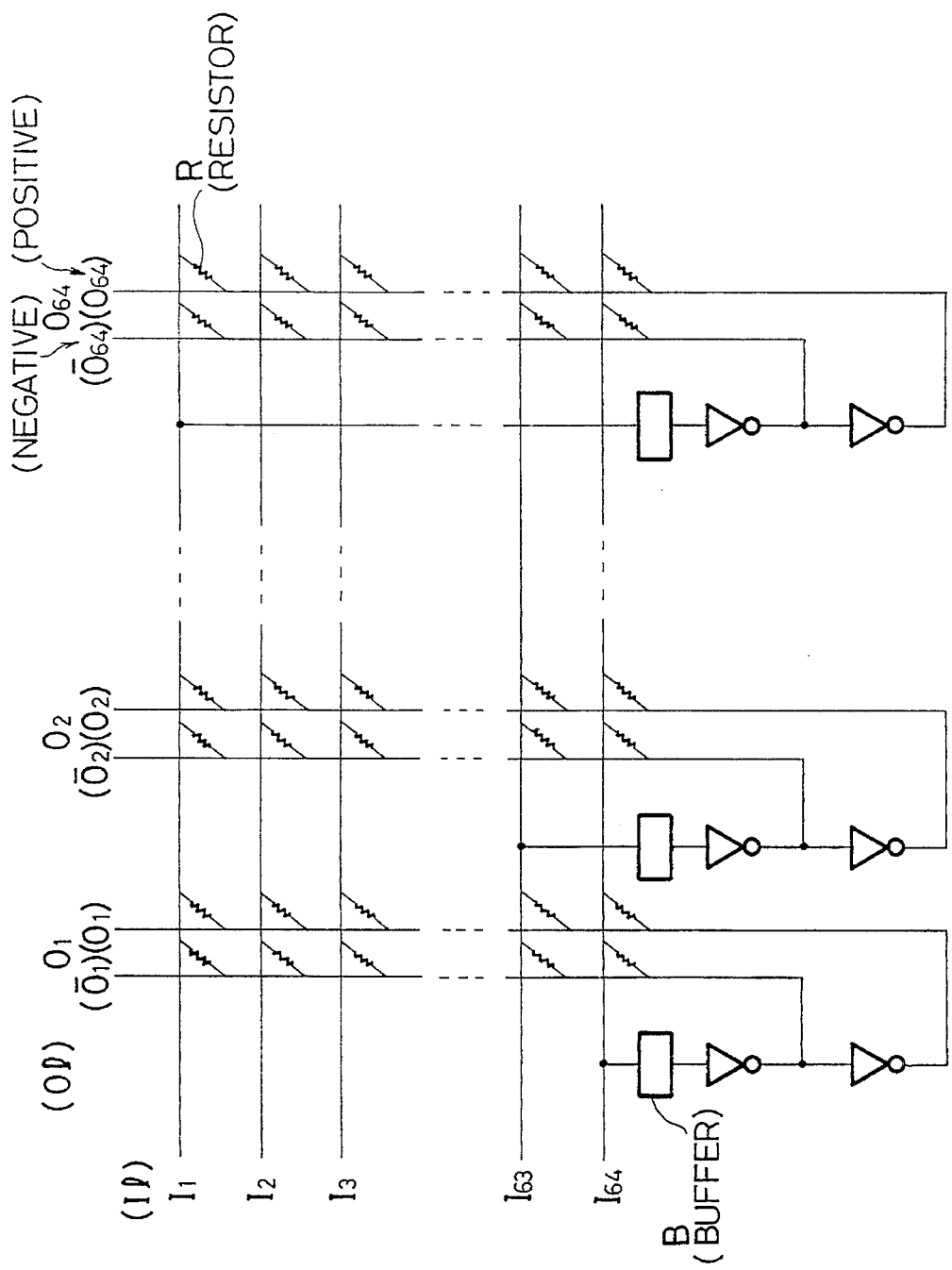
FIG. 7 is a schematic diagrammatic view showing essential part of a signal processing apparatus of a second embodiment according to the present invention.

FIG. 7 is a schematic diagrammatic view showing a neural network which is essential part of a signal processing apparatus of a second embodiment of the present invention.

The signal processing apparatus of the present embodiment is a neural network wherein inputs and outputs are separated from each other by a buffer B so that it may operate equivalently to that of a so-called analog neural network, and has a DCT calculation function similar to that of the first embodiment described hereinabove.

The neural network NN described above has, similarly to the case of the first embodiment, an input layer I1 and an output layer O1 each constituted from 64 units (neurons), and elements with which weight coefficients corresponding to mathematical calculation of a DCT are set as resistors R.

Setting of the resistors R is performed making use of weight coefficients transformed by learning in the first embodiment described hereinabove, that is, the weight coefficients employed by the neural network NN of the first embodiment.

According to the signal processing apparatus of the present embodiment, since the calculation speed is determined only by propagation delay by the elements (resistors R), the processing speed of the DCT can be improved remarkably.

For example, while several tens microseconds are required for processing of 1,024 points with the neural network NN of the digital type of the first embodiment, according to the neural network of the analog type of the present embodiment, the same processing can be executed on the order of several nanoseconds, and further, a high speed of $10^3$ times or so can be realized.

Incidentally, since DCT processing by a DSP of the highest speed at present is in units of milliseconds, a large capacity difference of $10^3$ times that of the DCT processing can be exhibited with the digital type neural network of the first embodiment described above, and with the analog type neural network of the present embodiment, a large capacity difference of $10^3$ times that can be exhibited.

Figure 8:
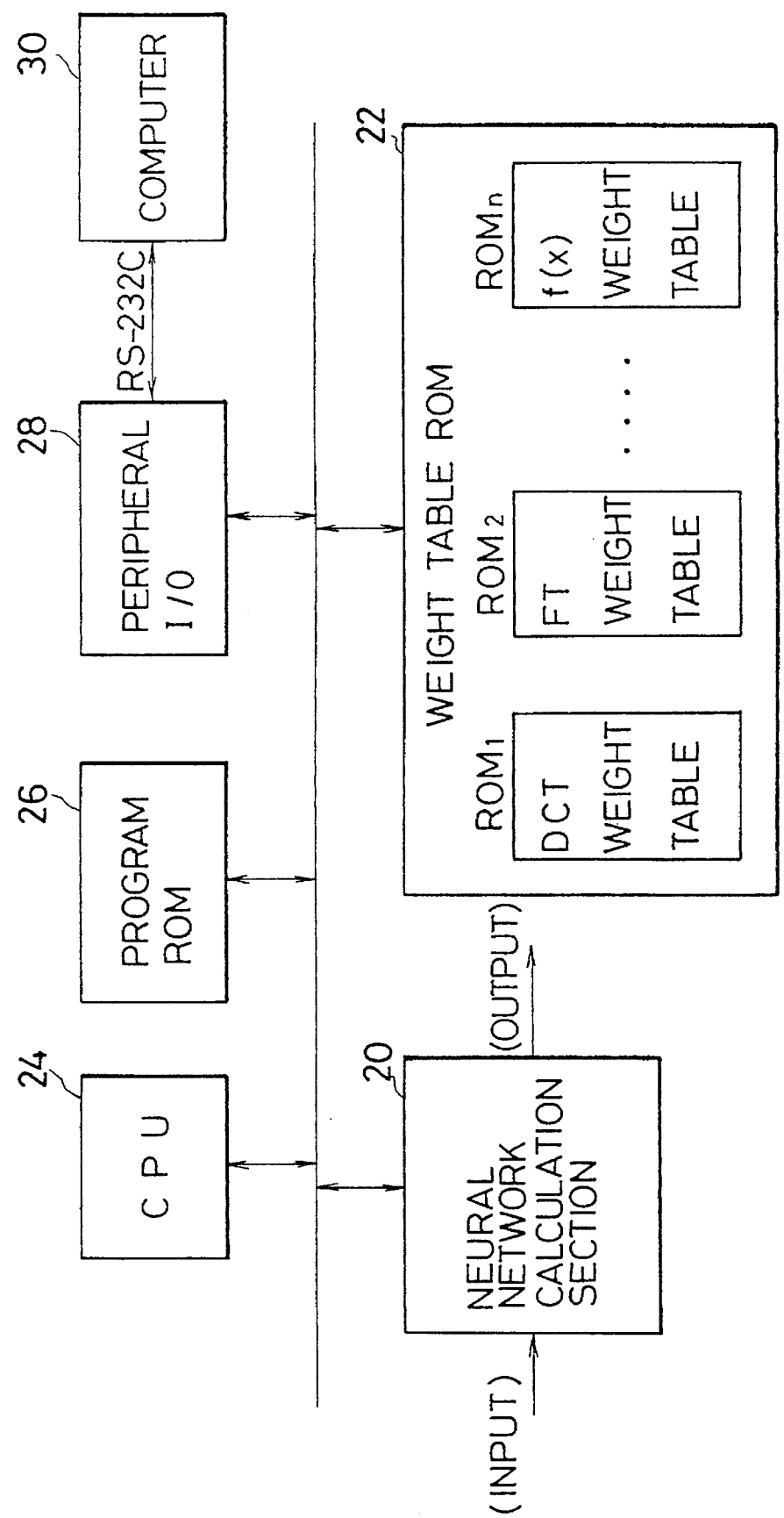
FIG. 8 is a block diagram showing a signal processing apparatus of a third embodiment according to the present invention.

FIG. 8 is a block diagram of a signal processing apparatus of a third embodiment according to the present invention.

The signal processing apparatus of the present embodiment includes a neural network calculation section 20 having a substantially same function as that of the signal processing apparatus of the first embodiment described above, and a weight table ROM (storage section) 22 in which weight coefficients of the neural network corresponding to various kinds of mathematical calculation are stored.

The neural network calculation section 20 and the weight table ROM 22 are connected to a CPU (central processing unit) 24 and a program ROM 26 by way of a CPU bus. Further, the CPU 24 described above is connected to a computer 30 by way of a peripheral I/O 28, and the peripheral I/O 28 and the computer 30 are connected to each other by way of a communication interface RS-232C.

The neural network calculation section 20 connected to the CPU bus has a function of receiving various parameters for calculation (information parameters regarding weight information for calculation processing, starting of a processing procedure, an end of processing and so forth) from the CPU 24 and returning the parameters to the CPU 24 after an end of processing. Meanwhile, a request for the calculation processing described above is made by way of the computer 30 by the user.

Weight tables which are information regarding weight coefficients corresponding to various kinds of mathematical calculation including orthogonal transforms such as a DCT and a FT are stored in the weight table ROM 22 described above. In particular, a DCT weight table (weight coefficients for a DCT) is stored in a ROM 1; a FT weight table (weight coefficients for a FT) is stored in a ROM 2; and an f(x) weight table (weight coefficients for an arbitrary operation expression f(x)) is stored in a ROM n.

The DCT weight table described above is produced by determining weight coefficients by learning to the neural network similar to that in the first embodiment described hereinabove, then extracting the weight coefficients and putting the thus extracted weight coefficients into a ROM. Meanwhile, the weight coefficients may be stored into a storage medium such as a RAM, a hard disk, or a floppy disk.

Figure 9:
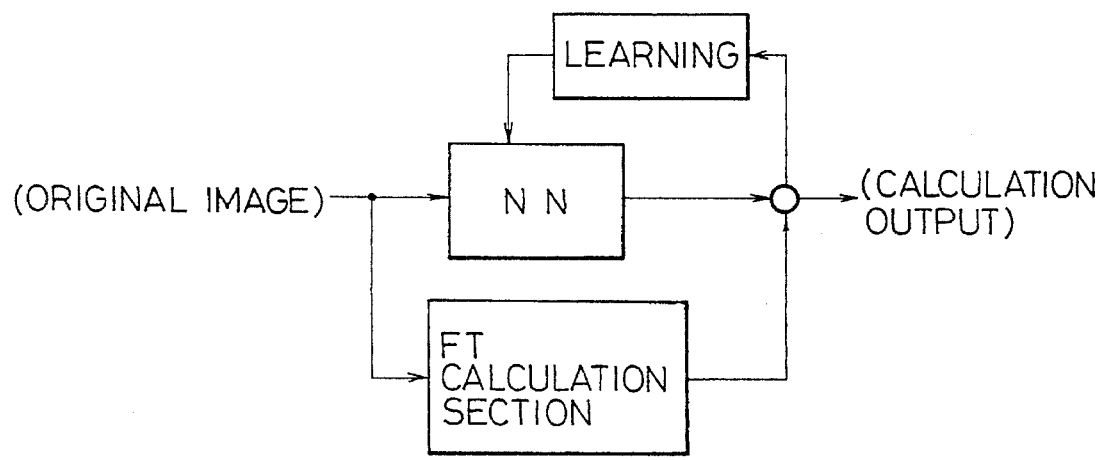
FIG. 9 is a diagrammatic view illustrating a method of determining a weight coefficient corresponding to a FT.

Further, the FT weight table described above is produced in a similar manner by actually executing, using a FT calculation section 32 in place of the DCT calculation section 18 of FIG. 6 described hereinabove as shown in FIG. 9, mathematical calculation with the FT calculation section 32, executing learning similarly to the case of the DCT described above using FT coefficients obtained by the execution of the mathematical calculation as teacher data to determine weight coefficients, and extracting the weight coefficients.

Further, also the f(x) weight table is produced by calculating weight coefficients corresponding to its mathematical calculation similarly to the case of the DCT or the FT described above and extracting the weight coefficients.

Figure 10:
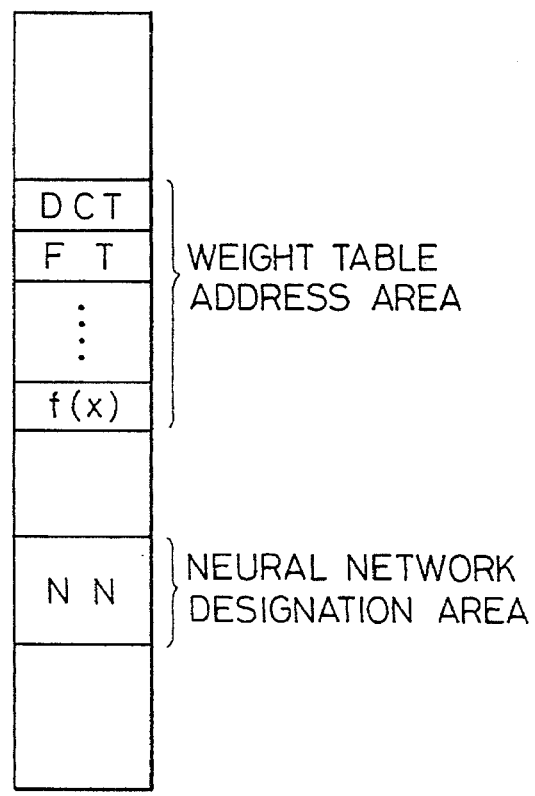
FIG. 10 a diagram showing an address map applied to the third embodiment.

Such putting of the extracted weight information (weight coefficients) into a ROM as described above is performed by storing it for each address area in accordance with an address map of FIG. 10.

In the present embodiment, when the user wants to execute calculation of, for example, an arbitrary function f(x), a signal for requesting f(x) calculation processing is sent from the computer 30 described above to the CPU 24 by way of an interface. The CPU 24 grasps contents of processing, accesses an area of the weight table ROM 22 in which the weight information for f(x) calculation is stored, and sets weight coefficients for f(x) calculation of the ROM n to the neural network calculation section 20.

Figure 11:
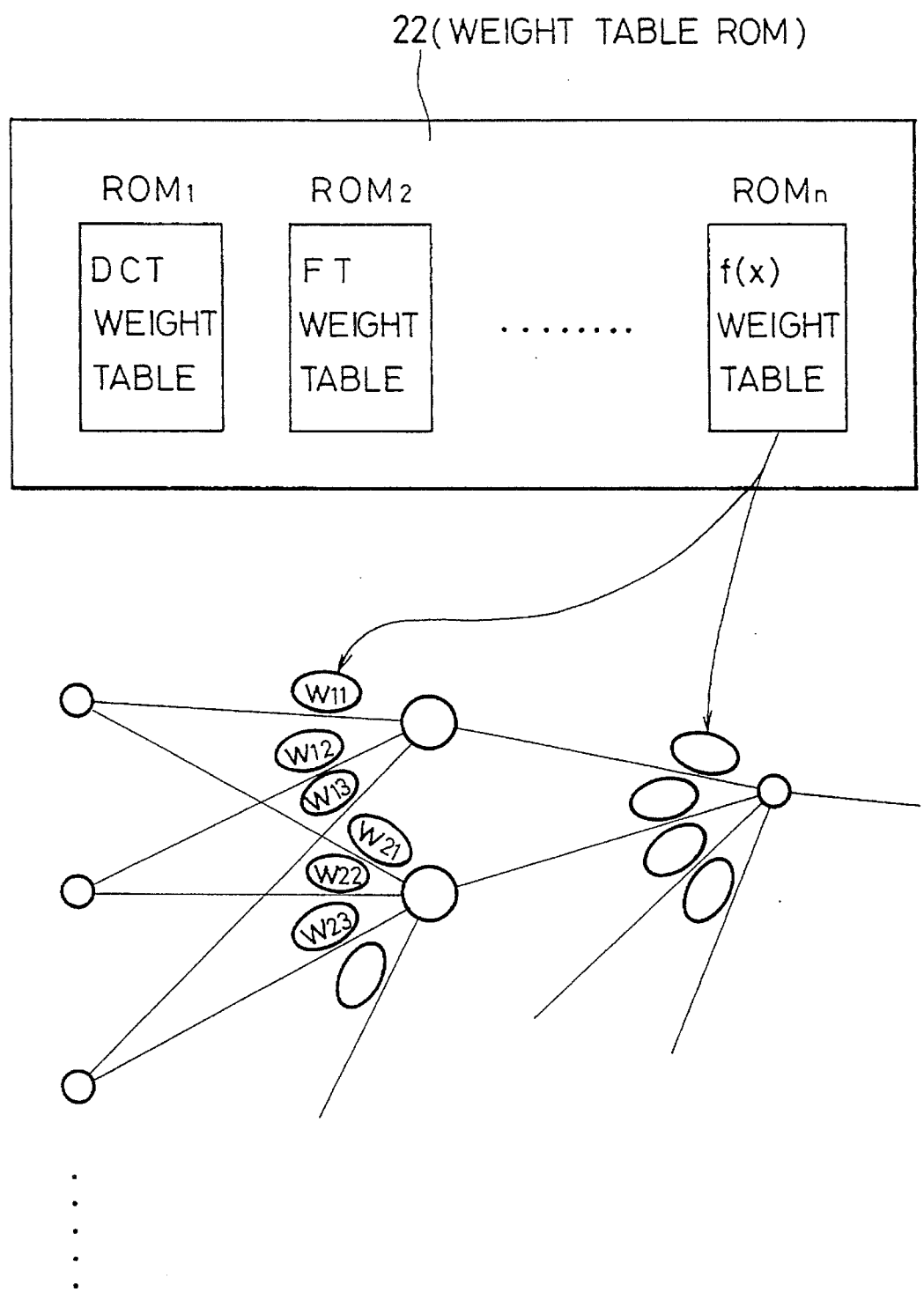
FIG. 11 is a schematic diagrammatic view illustrating a manner of setting weight coefficients to a neural network.

FIG. 11 conceptually illustrates a manner in which weight coefficients W11, W12, W13, . . . , W21, . . . corresponding to junctions between predetermined neurons are set from the ROM n.

After setting of weight coefficients to the neural network calculation section 20 described above comes to an end, a calculation processing starting instruction is sent out from the CPU 24. Consequently, similarly to the case of the first embodiment described above, image information (input data), for example, of one block is inputted directly to the neural network calculation section 20, and calculation processing of f(x) is started.

The neural network calculation section 20 described above operates in accordance with the CPU 24 and directly outputs processing outputs. Then, at a stage when the processing comes to an end, the neural network calculation section 20 sends out end information to the CPU 24 to notify the user by way of the RS-232C that the processing has come to an end.

Through the various stages described so far, results of calculation of f(x) are outputted as output signals and the calculation processing is completed.

Meanwhile, when calculation processing of a DCT or a FT is to be executed, calculation processing can be performed similarly to the case of the f(x) calculation described above by reading out the FT weight information of the ROM 2 from the weight table ROM 22 and setting it to the neural network calculation section 20 in accordance with a procedure similar to that of the case of the f(x) calculation.

As described so far, according to the present embodiment, various kinds of mathematical calculation processing can be executed suitably in accordance with an instruction of the user.

It is to be noted that, in the present embodiment, an interface function section for inputting input data directly to the CPU bus and another interface function section for outputting results of the processing may be provided while the CPU 24 has the function of the neural network processing section 20. In this instance, the neural network calculation section 20 of FIG. 8 can be omitted.

Figure 12:
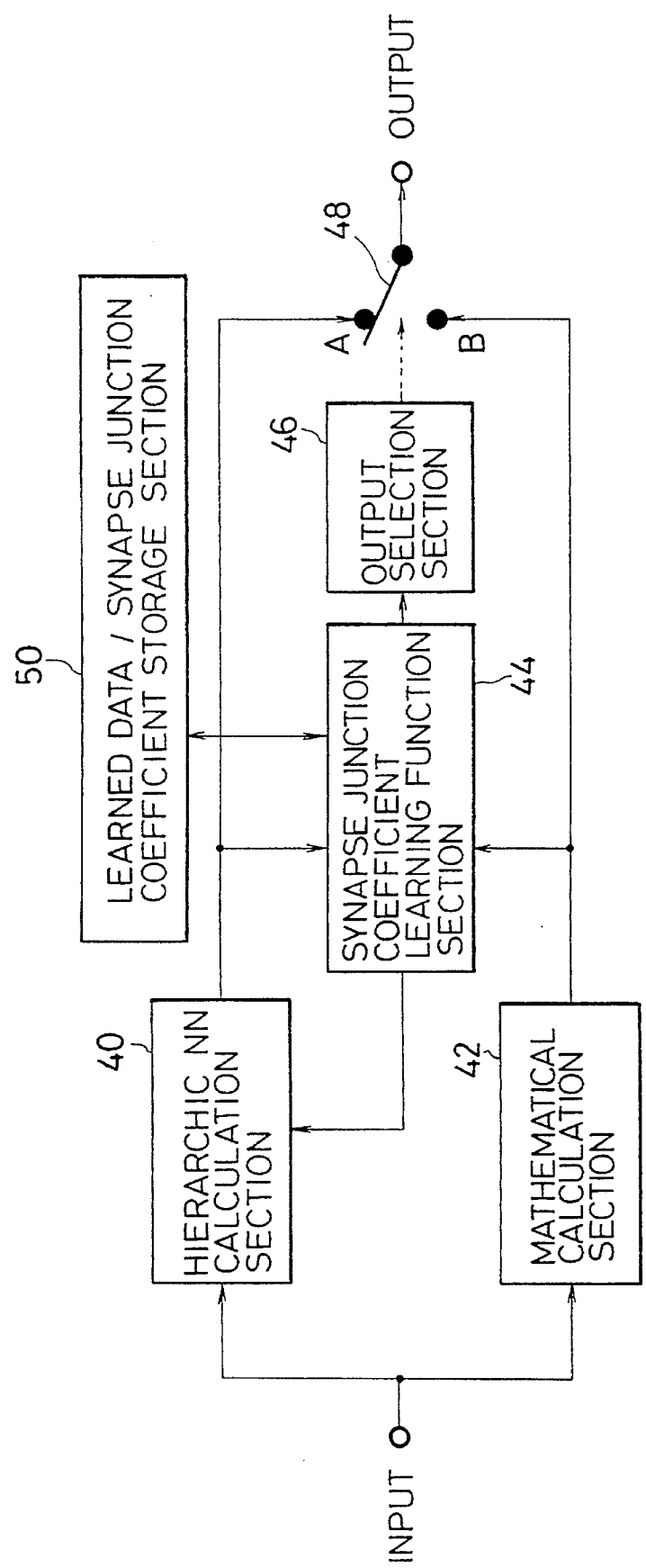
FIG. 12 is a block diagram showing general construction of a signal processing apparatus of a fourth embodiment according to the present invention.

FIG. 12 is a block diagram showing general construction of a signal processing apparatus of a fourth embodiment according to the present invention.

The signal processing apparatus of the present embodiment includes a neural network calculation section 40 for executing processing of a plurality of input signals by a neural network, a mathematical calculation section 42 for executing calculation based on an expression for the same input signals, a synapse junction coefficient learning section 44 for executing learning to results of processing outputted from the neural network calculation section 40 described above using results of calculation outputted from the mathematical calculation section 42 as teacher data, an output selection section 46 for selecting either one of outputs of the neural network calculation section 40 and the mathematical calculation section 42 described above based on results of the learning by the learning section 44, a switch 48 for switching an output based on the selection by the selection section 46, and a learned data/synapse junction coefficient storage section 50 for similarly storing therein results of learning by the learning section 44 described above.

In the neural network calculation section 40 of the signal processing apparatus described above, a hierarchic neural network substantially the same as that shown in the embodiment described hereinabove is built up, and the neural network calculation section 40 has a function substantially the same as that in the embodiment described hereinabove of the mathematical calculation section 42.

Subsequently, operation of the present embodiment will be described.

First, an actual expression for mathematical calculation with which calculation processing is desired to be executed with the neural network calculation section 40 is set into the mathematical calculation section 42, and the switch 48 is set to a terminal B side of a direction in which the output from the mathematical calculation section 42 is to be selected.

Subsequently, first data for mathematical calculation are inputted parallelly to the neural network calculation section 40 and the mathematical calculation section 42 described above, and calculation processing by the neural network (hereinafter referred to as neural processing) is executed in the neural network calculation section 40 while calculation processing based on the expression is executed in the mathematical calculation section 42. Results of the calculation executed in the mathematical calculation section 42 described above are outputted as final outputs by way of the switch 48 so as to use them for a desired purpose and also inputted to the learning section 44. Further, results of the processing by the neural network calculating section 40 are also inputted to the learning section 44.

After the results of the two kinds of calculation are inputted to the learning section 44 described above, in the learning section 44, learning for making, using the results of the calculation based on the expression obtained by the mathematical calculation section 42 as teacher data, synapse junction coefficients conform to those of the mathematical calculation based on differences between the teacher data and the results of outputs of the neural network, is executed and updating of the synapse junction coefficients is executed by the learning.

The learning to the neural network is executed repetitively either until the differences between the results of calculation by the neural network calculation section 40 and the results of calculation by the mathematical calculation section 42 become smaller than the predetermined threshold value or until next input data are received. The learned data and the synapse junction coefficients obtained by the learning operation based on the first data described so far (first time learning) are stored into the storage section 50 described hereinabove, thereby to assure learning operations for the next operation and operations.

When the first time learning described above comes to an end and next second data are inputted, second time learning consisting of the series of operations described above similar to the first time learning is executed for the second data. However, in the present second time learning, learning is executed repetitively equally for both of the first data and the second data until next third data are inputted. Then, when, as a result of the learning for the first data and the second data, outputs of the neural network are converged below a certain fixed error with regard to respective corresponding teacher data, the second time learning is ended, and inputting of next third data is waited.

When the second time learning described above is ended and third data are inputted, a learning operation similar to that described above wherein learning is repeated individually for the first data to the third data is executed for the third data, and a similar learning operation is executed successively and repetitively for fourth and following data to be inputted thereafter.

When, by executing the series of learning operations described above for a plurality of set of input data regarding calculation of one expression, errors of output values of the neural network with respect to teacher data are converged below a predetermined first threshold value, the switch 48 is switched to an output terminal A of the neural network calculation section 40 so that results (results of neural processing) of the calculation processing of subsequently inputted data by the neural network calculation section 40 may be outputted. By switching the outputs in this manner so that results of neural processing are outputted, mathematical calculation processing of a high speed can be realized.

In order to further reduce the errors of mathematical calculation by the neural network, high speed calculation is realized by making results of neural processing as final outputs as described above while also mathematical calculation processing by the mathematical calculation section 42 is executed parallely, and results of the mathematical calculation and corresponding results of processing by the neural network calculation section 40 are inputted to the learning section 44 to further continue learning to the neural network.

In this manner, also after results of learning become smaller than the first threshold value, learning is continued, and at a point of time when results of learning of data inputted newly become smaller than a second threshold value smaller than the first threshold value, the learning operation is ended, whereafter only neural processing (recognition) of new input data after then is executed. After the calculation capacity of the neural network reaches a sufficient degree of accuracy in this manner, it is possible to realize processing of a high speed by executing only neural processing.

The series of processing operations described so far will be described in more detail with reference to FIGS. 13 to 16.

Figure 13:
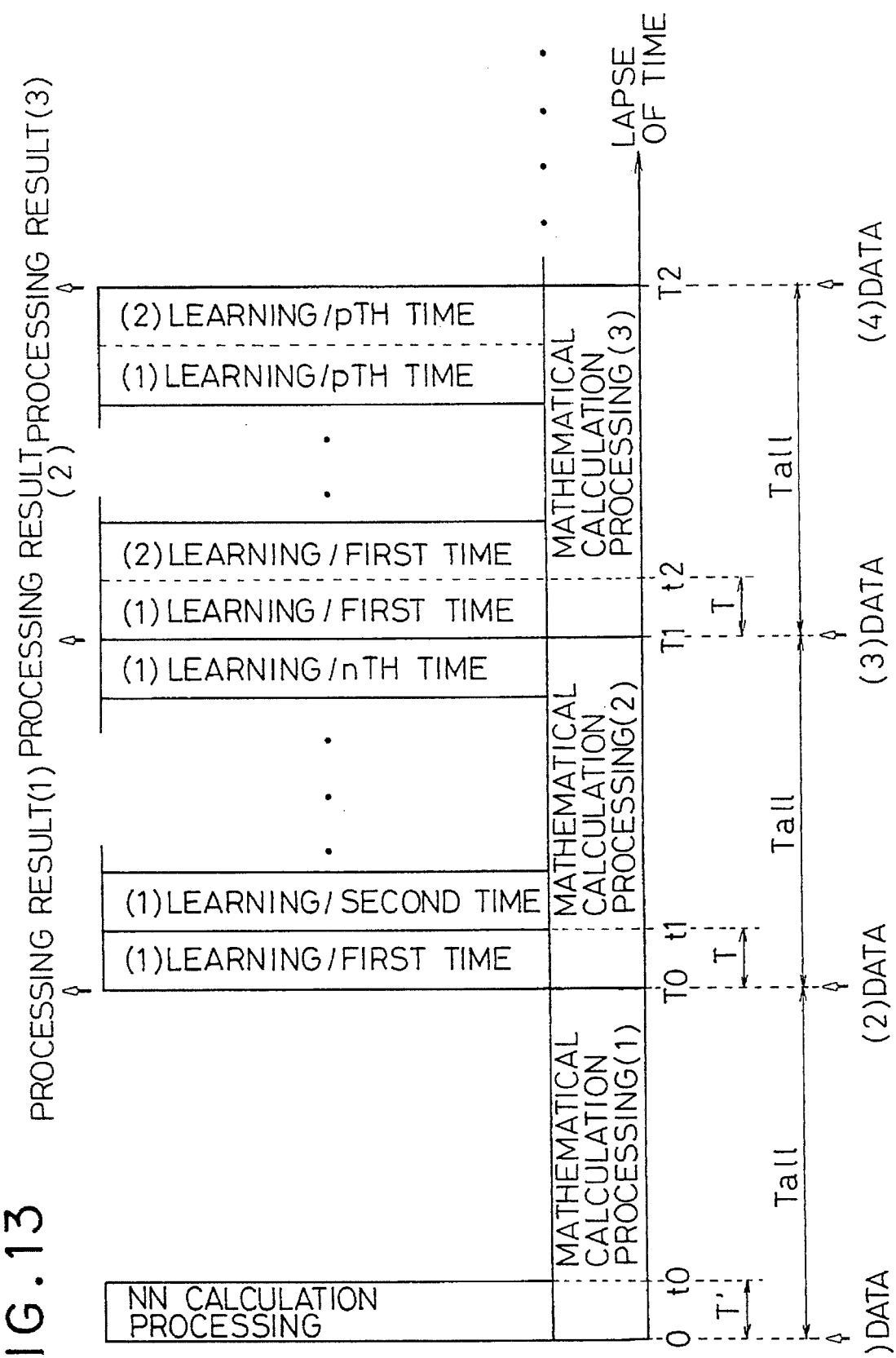
FIG. 13 is a time chart illustrating a learning process in the fourth embodiment.
Figure 14:
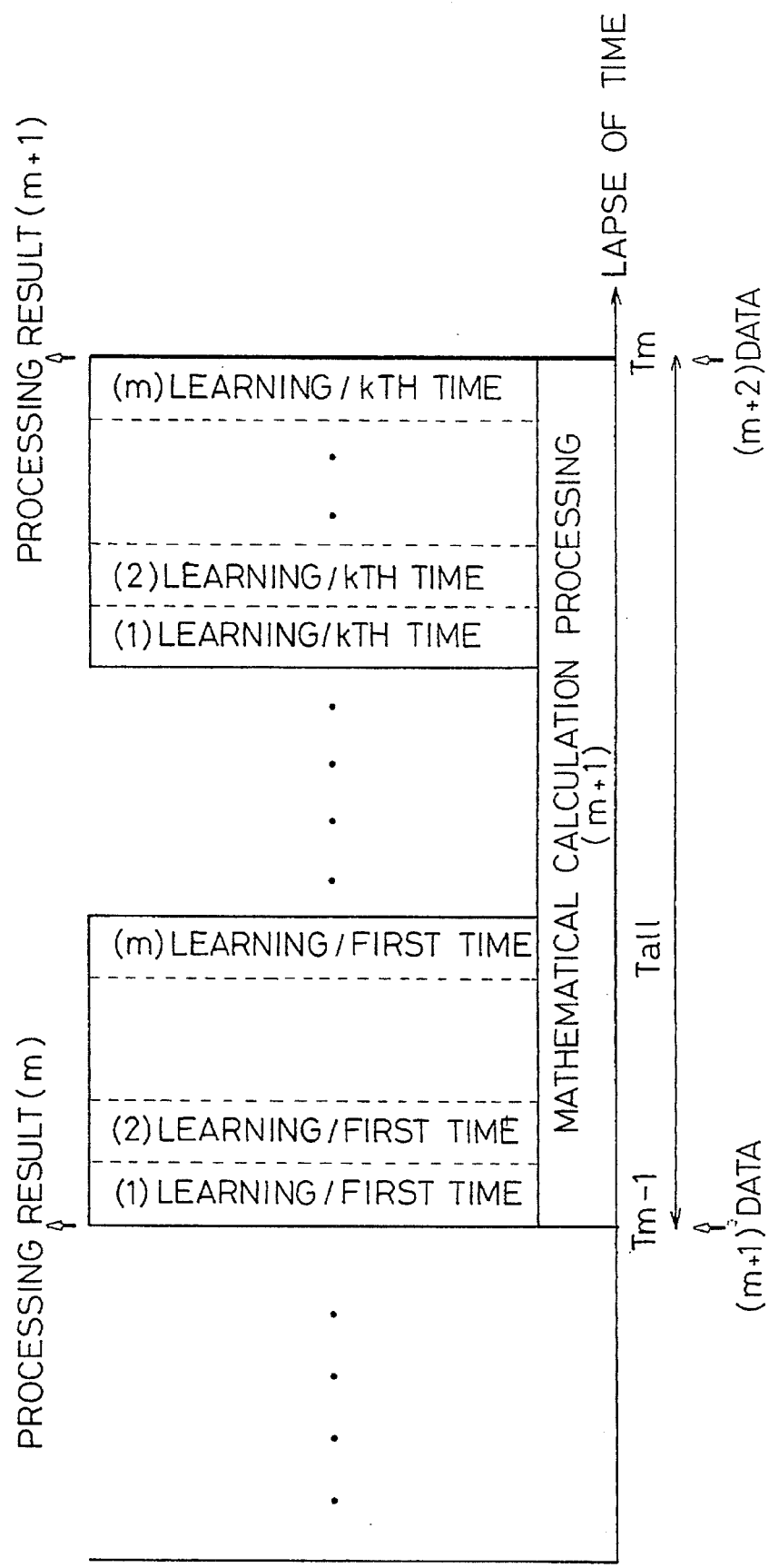
FIG. 14 is another time chart illustrating the learning process in the fourth embodiment.

FIGS. 13 and 14 are time charts illustrating operation at an initial stage of learning, and if first data are inputted at a time 0, then calculation processing by the neural network calculation section 40 is performed for the first data for a time T' (0 to $t_0$) while mathematical calculation processing (1) is executed by the mathematical calculation section 42. Results of the mathematical calculation processing (1) are outputted as a processing result (1).

Then, at a time T0, second data are fetched, and mathematical calculation processing (2) is executed for the second data by the mathematical calculation section 42. In the meantime, first time learning to the neural network is performed for the first data. The first time learning is performed for the results of the processing by the neural network calculation section 40, which is indicated as NN calculation processing in FIGS., using the results of calculation obtained by the mathematical calculation processing (1) as teacher data, and the number of learning operations is totally n times.

The number n of times can be set to a maximum integral number within Tall÷T where Tall is a time required for mathematical calculation and T ($T_0$ to $T_1$) is a time required for one learning operation. Normally, when neural processing for exclusive use such as pipeline processing or systric processing is performed, since T is on the order of GFLOPS while Tall is on the order of MFLOPS, n can be 10 to 1,000 or so.

After the mathematical calculation processing (2) is completed at the mathematical calculation section 42 and the first time learning consisting of n learning operations is completed, processing results (2) are outputted and third data are fetched at a time T1, and then, mathematical calculation processing (3) is executed for the third data by the mathematical calculation section 42 while a second time learning is performed.

The second time learning is performed by p times alternately for the two of the first data for which mathematical calculation has been completed already and the second data. The number p of times can be set to a maximum integral number within n÷2 when the times required for neural processing is all equal to T.

After the mathematical calculation processing (3) is completed and the second time learning is completed, processing results (3) are outputted at a time T2, and fourth data are inputted and similar processing is performed.

Generally, if m-th time learning to be executed for m-th data is represented in a time chart corresponding to FIG. 13, then this makes FIG. 14. In this FIG. 14, a time Tall required for mathematical calculation is shown in an enlarged condition. The number k of learning operations in this instance can be set to a maximum integral number smaller than n÷m.

While learning can be performed in a high efficiency by executing learning at an initial stage in accordance with the method described so far, when T is not necessarily sufficiently small comparing with Tall or when the number of sets of learned data is so great that the maximum integral number smaller than n÷m is zero, naturally k learning operations may be executed for m sets of data beyond Tall.

Figure 15:
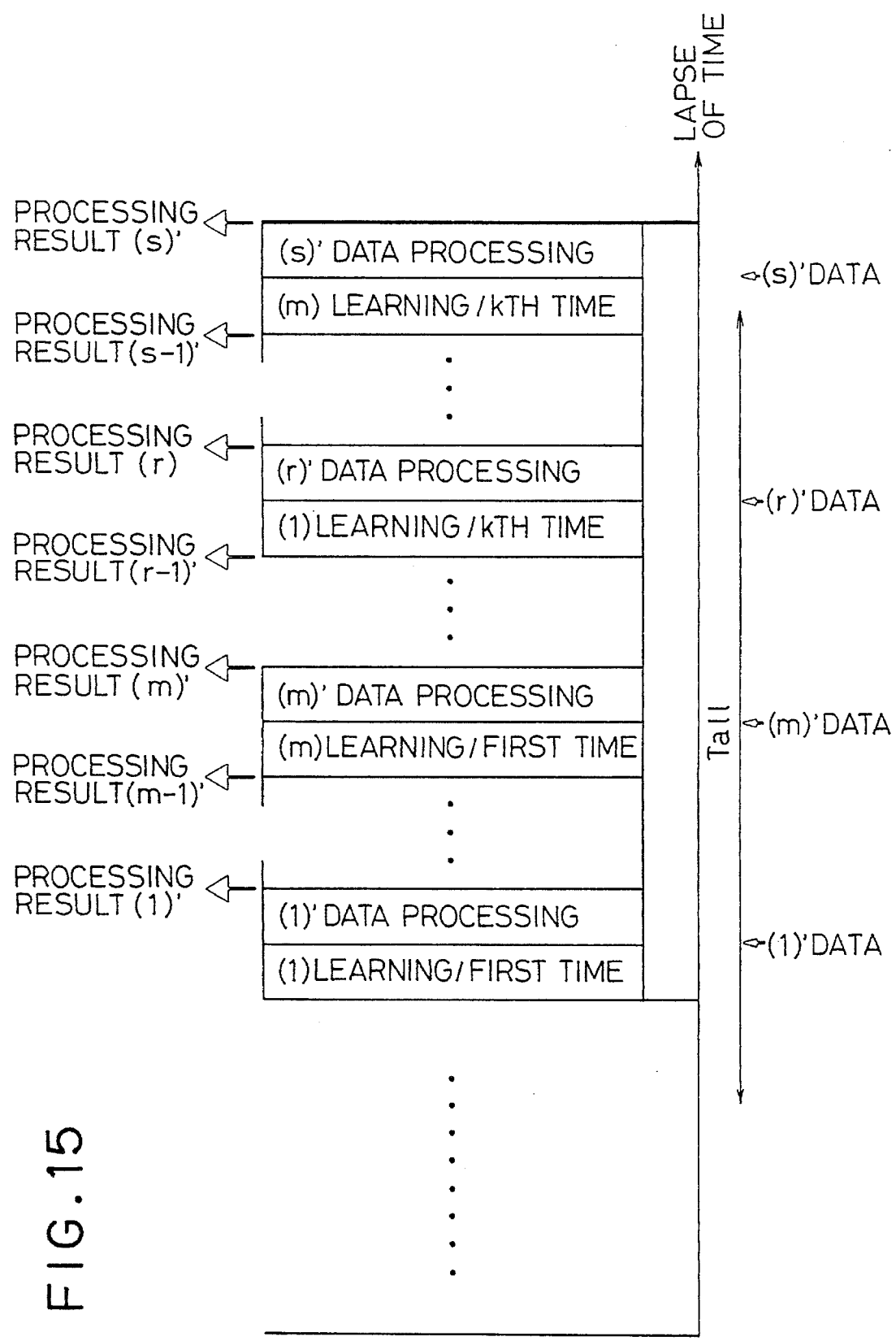
FIG. 15 is a further time chart illustrating the learning process in the fourth embodiment.

When, as a result of execution of learning to the neural network using m-th data, the output errors become smaller than the first threshold value and the results of processing by the neural network reach a stage wherein they can be used practically, the processing of the signal processing apparatus is changed so that, as shown, for example, in the time chart of FIG. 15, learning of the first to m-th data described above and neural processing of new 1'st data to m'th data are executed alternately to further continue learning to the neural network.

In particular, after first time learning is performed for the first data, neural processing of the l'st data (indicated by (1)' data in FIG. 14) inputted newly is executed, and results (1)' of processing thus obtained are outputted. Thereafter, first time learning is performed for the second data described above, and at a point of time when the learning comes to an end, though not shown, new 2'nd data are inputted and neural processing of the data is executed, and then, results of processing are outputted as results (2)' of processing. By parallelly executing the first time learning of the m-th data described above and the neural processing of the new m'th data fetched at a point of time when the learning comes to an end in such a procedure as described above, the first time learning after achievement of the first threshold value for the first to the m-th data is completed.

While the first time learning described above is executed for the first to the m-th data, processing results (1)' to (m)' obtained for the new 1'st to m'th input data obtained by neural processing executed in parallel are utilized for a predetermined object.

While learning is continued for the first to m-th data for which learned data have been stored already as described so far, between two successive learning operations, neural processing is successively executed for new (m+1)'th and following data to be further inputted in accordance with a method in which neural processing of the new data is to be executed, and k learning operations are performed. It is to be noted that, in FIG. 15, (k−1)×m+1 is represented by r and k×m is represented by S. The number k of times can be set to a maximum integral number smaller than n÷2 since, if it is assumed that the equal time T is required for both of learning and neural processing of new input data, two times T are required for one learning operation of one data.

In this manner, after results of learning become smaller than the first threshold value, the learning is continued in parallel to actual neural processing in accordance with the method described in detail so far until the output errors of the neural network become smaller than the second threshold value.

After the results of learning become lower than the second threshold value with which the accuracy of neural processing is sufficiently high, the learning is stopped, and neural processing only of new data is performed. As a result, since it is possible to share all of the time to the neural processing described above, it is possible to execute n mathematical calculation processes for Tall by high speed neural processing.

After the results of learning have become smaller than the second threshold value with which a sufficient accuracy can be assured for neural processing, it is possible to continuously execute high speed mathematical calculation processes by the neural network, but it is desirable not to end mathematical calculation processing by the mathematical calculation section 42 after then but to always monitor an error between the calculation outputs of the neural network calculation section 40 and the mathematical calculation outputs of the mathematical calculation section 42 with respect to an input.

As a result of continuation of the monitoring, if the error between the outputs of the neural network calculation section 40 and the outputs of the mathematical calculation section 42 exceeds the second threshold value, then at a point of time when the error exceeds the second threshold value, re-learning is performed in accordance with the method wherein learning and neural processing are performed alternately as illustrated in FIG. 15 described above, and then if the error exceeds a level for practical use, the switch 48 is switched to the terminal B so that results of mathematical calculation by the mathematical calculation section 42 may be outputted. By continuing the monitoring even after the accuracy of the neural network has been improved in this manner, a request for error back propagation learning in perceptron that it is necessary, since an error back propagation method is employed, to always pay attention to over-learning and to supervise whether or not the universalization capacity has been acquired is met, and it is possible to establish a mathematical calculation function by a neural network of a high reliability.

Figure 16:
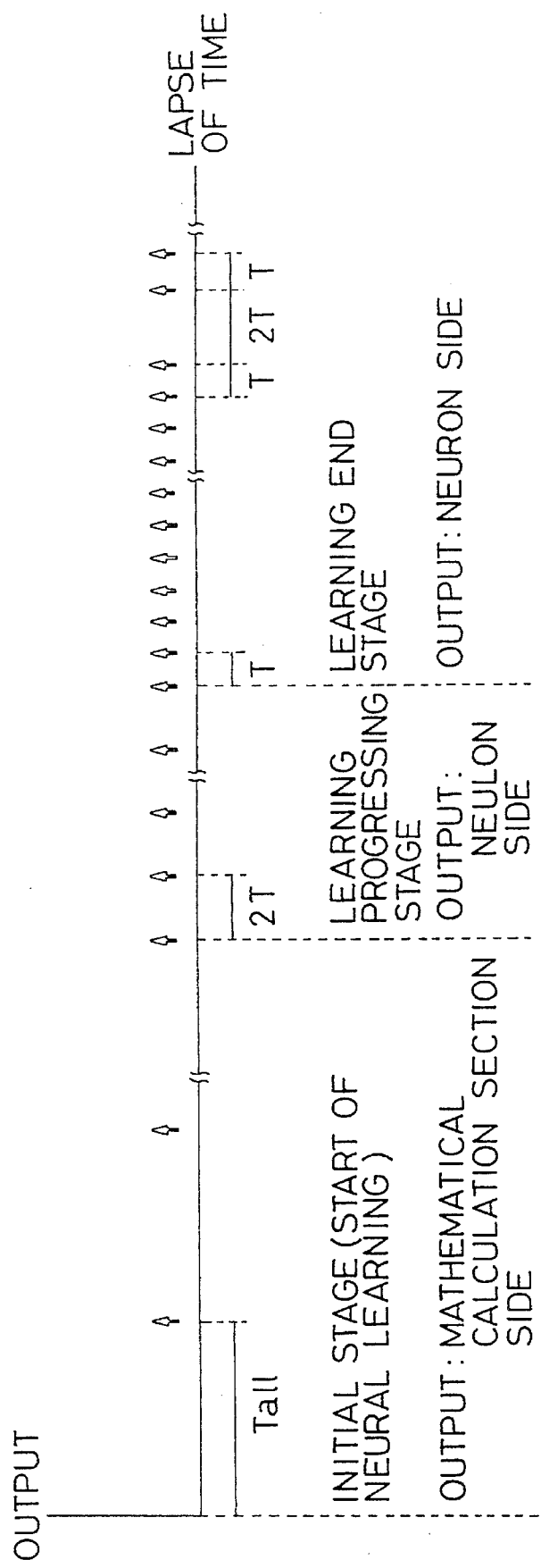
FIG. 16 is a time chart schematically illustrating processing from an initial stage of learning to another stage after ending of the learning.
Figure 18A:
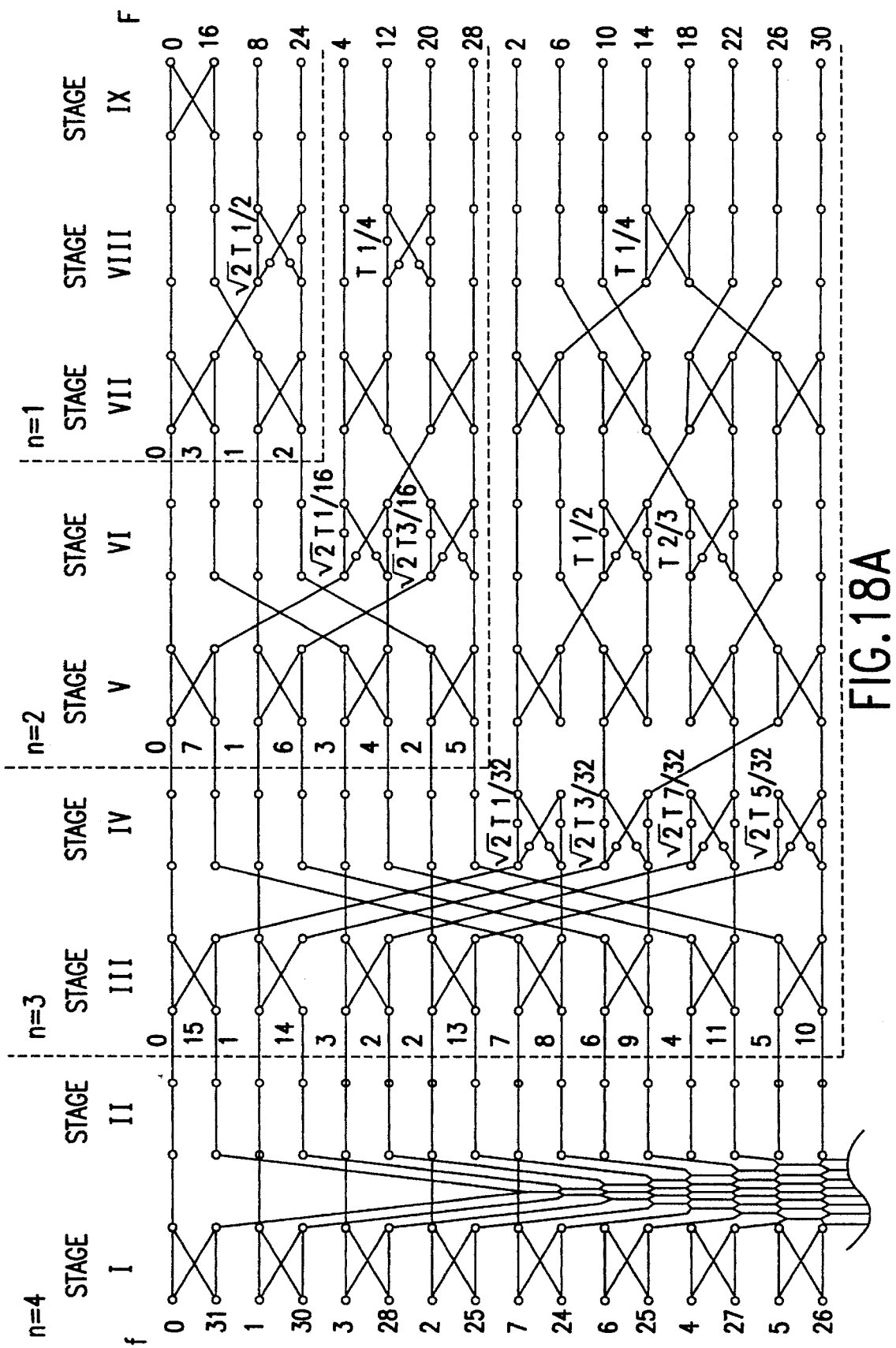
FIG. 18 is a diagram illustrating a conventional method of discrete cosine processing.
Figure 18B:
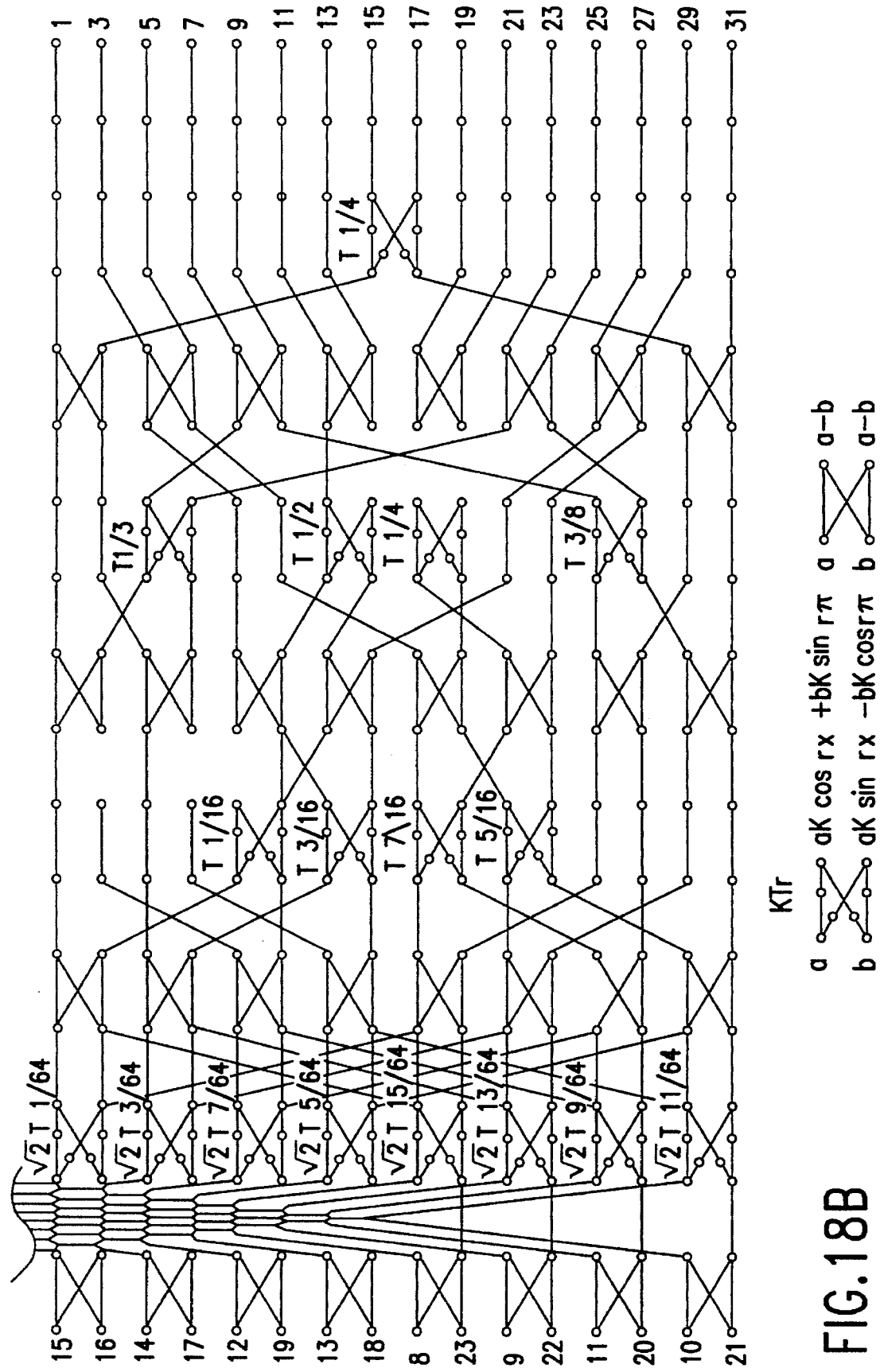

If the lapse of time of processing in the present embodiment described in detail so far is summarized, then this is such as shown in FIG. 16. It is to be noted that T represents that neural processing is executed solely, and 2T represents that learning and neural processing are executed alternately and successively. Further, the 2T at the stage of ending of learning represents that neural processing is executed successively after re-learning.

According to the present embodiment, at an initial stage of learning when the calculation function of the neural network has not been established as yet, it is possible to output, by an output from the mathematical calculation section 42, a result of calculation processing immediately after data have been inputted, and accordingly, an output having a high accuracy can be utilized. Further, by outputting a result of calculation of the neural network calculation section 40 at a point of time when the neural network can almost acquire the mathematical calculation function due to the learning function (when learning proceeds), results of high speed calculation can be outputted. Further, by causing learning to proceed simultaneously when results of calculation are outputted in this manner, the accuracy of neural processing can be further improved.

Further, by ending learning when the learning of the neural network has been converged and executing only neural processing, processing can be executed at a higher speed than at the stage when learning is performed parallelly, and besides, a result of processing of a higher accuracy can be obtained.

Furthermore, by supervising the calculation accuracy even after learning to the neural network is completed, results of mathematic calculation processing of a high accuracy can always be obtained by neural processing.

FIG. 17 is a diagrammatic view schematically showing an outline of a neural network provided in a signal processing apparatus of a fifth embodiment according to the present invention.

The signal processing apparatus of the present embodiment is substantially the same as that of the first embodiment described hereinabove except that the neural network has a two-layer structure having no intermediate layer and a weight coefficient corresponding to a predetermined product summing operation is set to each synapse coupling.

In the following, a case wherein an orthogonal transform is executed as one of product summing operations with the signal processing apparatus described above will be described.

An orthogonal transform is a type of mapping for transforming space axis information or time axis information into frequency axis information with a base function and is defined, when it is a two-dimensional orthogonal transform, by the following expression (10).

$$F(u,v) = \Sigma\Sigma f(m,n) \cdot \Phi^{(u,v)}(m,n) \quad (10)$$

where f is space axis information or time axis information, Φ is a base function, and F is information after transform into a frequency. The frequency information F can be calculated as coefficients ranging from a DC component (0, 0) to a high frequency component F(u, v). Meanwhile, the base function Φ is, when the space axis information f is image data, a base image and is given by the following expression (11).

$$\Phi^{(u,v)}(m,n) = (1/N) \times (-1)^{b(u,v,m,n)} \quad (11)$$
$$b(u,v,m,n) = \sum_{j}^{\log_2 N - 1} [b_j(u) \cdot b_j(m) + b_j(v) \cdot b_j(n)]$$

where $b_j(x)$ is the j-th bit when (x) is represented in binary notation.

In this manner, an orthogonal transform of an image corresponds to calculation of coefficients by convolution between individually corresponding base function and image data.

The two-layer neural network NN shown in FIG. 17 described above is constituted from an input layer I1 for inputting image data from f(0, 0) to f(m, n) and an output layer O1 for outputting coefficients of F(0, 0) to F(u, v) obtained by an orthogonal transform, and is provided with a calculation function of an orthogonal transform by learning to the neural network NN using predetermined teacher data.

In the following, a case wherein an image of 8×8 picture elements is inputted as data will be described. In this instance, since the number m of picture elements in the vertical direction is m=8 and the number n of picture elements in the horizontal direction is n=8, the number of image data to be inputted is 64 (=8×8) of f(0, 0) to f(7, 7), and also the number of coefficients to be outputted is 64 of F(0, 0) to F(7, 7).

It is to be noted that, in FIG. 17, only a condition wherein the uppermost neuron of the output layer O1 is coupled to all of the neurons of the input layer I1 is shown and such junctions of the other neurons of the output layer O1 are omitted for convenience of illustration. Actually, all of the other neurons of the output layer O1 are individually coupled to all of the neurons of the input layer I1 in a similar manner as shown in FIG. 17. Accordingly, here the total number of synapse couplings between the neurons is 64×64.

The neural network NN of the two-layer structure wherein each of the input layer and the output layer had 64 neurons in this manner was constructed and learning was performed for image data to be actually inputted in accordance with the back propagation method using results of mathematical calculation calculated applying the expressions (10) and (11) described hereinabove as teacher data, and the following results were obtained. It is to be noted that here an Hadamard transform was adopted as an orthogonal transform.

A maximum square error (RMS) and a maximum error (MAX) between the teacher data and output data were calculated while repeating learning. In the first time learning, RMS= 0.160846 and MAX=0.810267; but in the twelfth time learning, RMS=0.016813 and MAX=0.262665; and further in the 32nd learning, RMS=0.007841 and MAX= 0.064110, and at this stage, an orthogonal transform expression was able to be approximated in the accuracy of 8 bits. Learning was further continued, and after 400,000 learning operations, RMS=$5\times10^{-6}$ and MAX=$4.2\times10^{-6}$, with which a result of calculation of the accuracy of 17 bits was obtained.

Meanwhile, for comparison, similar learning was conducted using a three-layer neural network having 64 inputs and 64 outputs, and it proved that 300 learning operations were required before the accuracy of 8 bits, which is a sufficient accuracy for the subject of image processing, was acquired.

As described so far, according to the present embodiment, it can be recognized that an orthogonal transform can be calculated with a high degree of accuracy by adopting the two-layer neural network NN. While normally a neural network is constituted from three or more layers, it has been made clear only as a result of a hard investigation of the inventor that a neural network of the two-layer structure as in the present embodiment is very effective on product summing calculation.

While the present invention has been described in detail so far, the present invention is not limited to the embodiments described above but can be modified in various manners without departing from the scope of the present invention.

For example, a neural network installed in a signal processing apparatus of the present invention is not limited to that of the two-layer or three-layer structure in the embodiments described hereinabove and may be of the four or more layer structure.

Further, while a plurality of input signals are involved in the embodiments described hereinabove, only one input signal may be involved.

Further, the subject to be processed in the present invention is not limited to image information and is not particularly limited if mathematical calculation can be performed for the information such as audio information.

Further, a plurality of input signals may be produced by dividing a continuous signal, for example, by time division.

Further, the orthogonal transform is not limited to the DCT, the FT or the Hadamard transform described hereinabove, and also a DST (discrete sine transform), a Walsh transform, a Legandre transform, a Karhunen-Loeve transform, a Slant transform and so forth can be listed. Also the kind of mathematical calculation is not limited to an orthogonal transform.

Further, when learning of an orthogonal transform is to be performed, a base image of the subject orthogonal transform may be used, and in this instance, learning can converge rapidly and it is possible to realize acquisition of the universalization capacity readily.

Further, the mathematical calculation processing which can be applied to the present invention may be edge filter processing of a moving picture, and it is also possible to extract an edge portion of a moving picture on the real time basis by effecting learning of the neural network using a result of the processing as teacher data.

Further, the mathematical calculation processing is not limited to one expression but may be a series of calculation processes including execution of shading correction of an input signal, binary digitization of a result of the shading correction, calculation of an area from the binary digitized data and so forth, and in this instance, it is possible to cause the neural network to perform the series of mathematical calculation processes at a time by executing learning of the neural network using a result of the calculation of the area as teacher data.

Further, it is also possible to provide the neural network with a function of recognizing and extracting only a desired object by selecting, after the shading correction described above, only an article different from the object from the binary digitized data, performing the processing till the selection by mathematical calculation and executing learning of the neural network using a result of the selection as teacher data.

Furthermore, as the kind of mathematical calculation, it can be applied, in addition to image processing, for example, to automatic control. In this instance, it is also possible to apply the neural network to automatic control by actually calculating input data based on a transfer function and executing learning of the neural network using a result of the calculation as teacher data.

When the signal processing apparatus of the fourth embodiment described hereinabove is to be applied to the automatic control, it becomes possible to perform, at an initial stage of learning, control similar to that of the conventional learning and then utilize, at a point of time after learning has proceeded to some degree, the output of the neural network to control while continuing the learning, and accordingly, control of a high follow-up performance becomes possible. Further, since the learning becomes unnecessary at a stage after the learning has converged, the follow-up performance can be further improved, and besides, it is possible to effect control with a very high degree of accuracy.

CAPABILITY OF EXPLOITATION IN INDUSTRY

As described so far, according to the present invention, predetermined mathematical calculation processes can be performed parallelly and hence at a high speed for a plurality of input information signals.

Further, desired mathematical calculation processing can be executed suitably by individually storing weight coefficients corresponding to a plurality of kinds of mathematic calculation into a storage section.

Further, since mathematical calculation processing can be substituted for processing by a neural network, parallel processing of mathematical calculation can be realized readily without a conventional parallel transform algorithm of mathematical calculation.

I claim:

1. A signal processing device for processing a portion of an input signal, the input signal portion having a predetermined size, the signal processing device comprising:

output selection means for selecting one of a first output signal and a second output signal as a final output signal based on a predetermined threshold;

first output signal generating means for computing the first output signal from the input signal portion based on a predetermined signal transform algorithm;

algorithm selection means for selecting one of a plurality of signal transform algorithms as the predetermined signal transform algorithm in the first output signal generating means;

a neural network operating concurrently with the first output signal generating means and generating the second output signal from the input signal portion based on a current set of learned weighted coefficients, the neural network comprising:

an input layer of neurons having a number of neurons equal to the predetermined size of the input signal portion;

an output layer of neurons generating the second output signal, each neuron of the output layer connected to each neuron of the input layer;

the current set of learned weighted coefficients, wherein each output layer neuron receives an output from each one of the input layer neurons by multiplying an output of each one of the input layer neurons by one of the current set of learned weighted coefficients;

learning means for generating the current set of learned weighted coefficients based on a comparison of the first and second output signals, the learning means operating concurrently with the first output signal generating means;

storage means for storing a plurality of sets of learned weighted coefficients, each set of learned weighted coefficients corresponding to one of the plurality of signal transform algorithms; and setting means for setting one of the plurality of sets of learned weighted coefficients as the current set of learned weighted coefficients based on the signal transform algorithm selected by the algorithm selection means.

\* \* \* \* \*